United States Patent
Sato et al.

(10) Patent No.: US 7,215,809 B2
(45) Date of Patent: May 8, 2007

(54) THREE-DIMENSIONAL IMAGE PRODUCING METHOD AND APPARATUS THEREFOR

(75) Inventors: Seiji Sato, Kanagawa (JP); Hidehiko Sekizawa, Kanagawa (JP); Koichi Takeuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 84 days.

(21) Appl. No.: 09/980,888

(22) PCT Filed: Apr. 4, 2001

(86) PCT No.: PCT/JP01/02908

§ 371 (c)(1),
(2), (4) Date: Dec. 3, 2001

(87) PCT Pub. No.: WO01/76259

PCT Pub. Date: Oct. 11, 2001

(65) Prior Publication Data

US 2003/0007193 A1    Jan. 9, 2003

(30) Foreign Application Priority Data

| Apr. 4, 2000 | (JP) | ............................. 2000-101769 |
| Apr. 4, 2000 | (JP) | ............................. 2000-101770 |
| Apr. 4, 2000 | (JP) | ............................. 2000-101771 |
| Apr. 25, 2000 | (JP) | ............................. 2000-123510 |

(51) Int. Cl.
*G06K 9/00* (2006.01)
(52) U.S. Cl. ........................................ 382/154; 348/46
(58) Field of Classification Search ................ 382/154; 348/49, 46; 359/640
See application file for complete search history.

(56) References Cited

U.S. PATENT DOCUMENTS

| 4,641,038 A | 2/1987 | Baker ........................ 250/578 |
| 4,647,965 A * | 3/1987 | Imsand ........................ 358/88 |

(Continued)

FOREIGN PATENT DOCUMENTS

GB    2152781    8/1995

(Continued)

*Primary Examiner*—Matthew C. Bella
*Assistant Examiner*—Tom Y. Lu
(74) *Attorney, Agent, or Firm*—Sonnenschein Nath & Rosenthal LLP

(57) ABSTRACT

A center of rotation O of a camera 10 is determined on an axis 45 passing through the position between pickup target objects A, B and the camera 10 in the direction from a lens 3 to a CCD 2. Before rotation (in a first state), an optical axis 30 of the camera 10 swings to the left with the point O as center and with an angle è with respect to the axis 45, whereas after rotation (in the second state), the optical axis 30 swings to the right with the point O as center and with angle è with respect to the axis 45. The pickup target objects A, B, C form images on a pickup face 2a, respectively. In order that the formed image $b_2$, for example, of the image picked up after movement may coincide with the formed image $b_1$ of the image before movement, the image after rotation is moved in the cross direction. Then, the image before rotation and the image obtained by moving the image after rotation in the cross direction are input to a display which allows a stereovision due to binocular parallax, which are seen as a stereoscopic image.

12 Claims, 24 Drawing Sheets

U.S. PATENT DOCUMENTS

| | | | |
|---|---|---|---|
| 4,895,431 A * | 1/1990 | Tsujiuchi et al. | 350/320 |
| 5,157,484 A | 10/1992 | Pritchard et al. | 358/91 |
| 5,222,477 A * | 6/1993 | Lia | 128/6 |
| 5,485,172 A | 1/1996 | Sawachika et al. | 345/8 |
| 5,726,704 A * | 3/1998 | Uomori | 348/47 |
| 5,825,456 A * | 10/1998 | Tabata et al. | 351/201 |
| 6,094,215 A * | 7/2000 | Sundahl et al. | 348/42 |
| 2004/0165062 A1* | 8/2004 | Kang | 348/46 |

FOREIGN PATENT DOCUMENTS

| | | |
|---|---|---|
| JP | 1-251990 | 10/1989 |
| JP | 2-172595 | 7/1990 |
| JP | 4-96493 | 3/1992 |
| JP | 6-18815 | 1/1994 |
| JP | 30446 | 2/1994 |
| JP | 6-86331 | 3/1994 |
| JP | 6-503184 | 4/1994 |
| JP | 6-343184 | 12/1994 |
| JP | 7-95595 | 4/1995 |
| JP | 9-65371 | 3/1997 |
| JP | 11-164326 | 6/1999 |
| WO | WO 92/09922 | 6/1992 |
| WO | WO 02/075453 A1 * | 9/2002 |

* cited by examiner

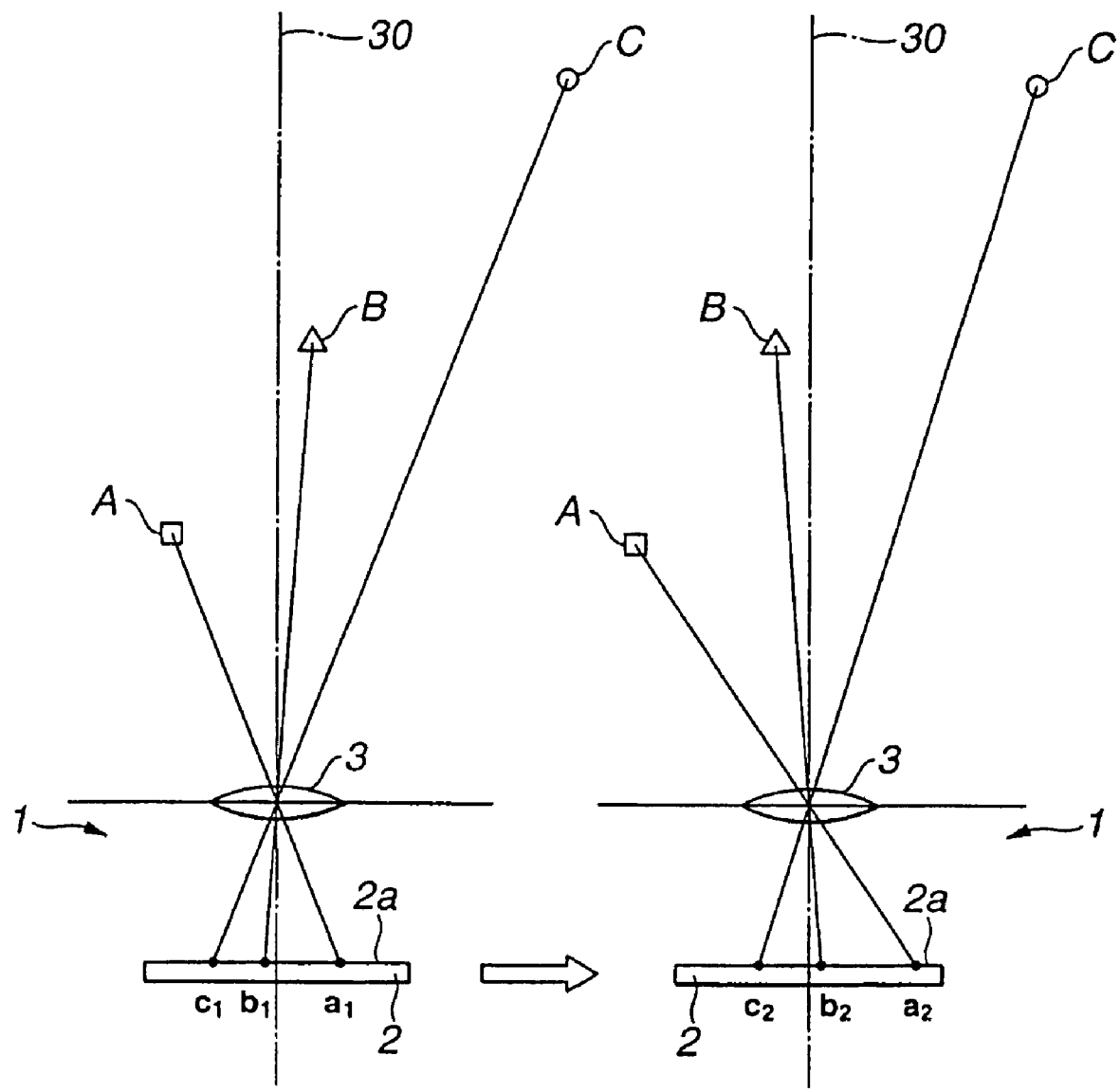

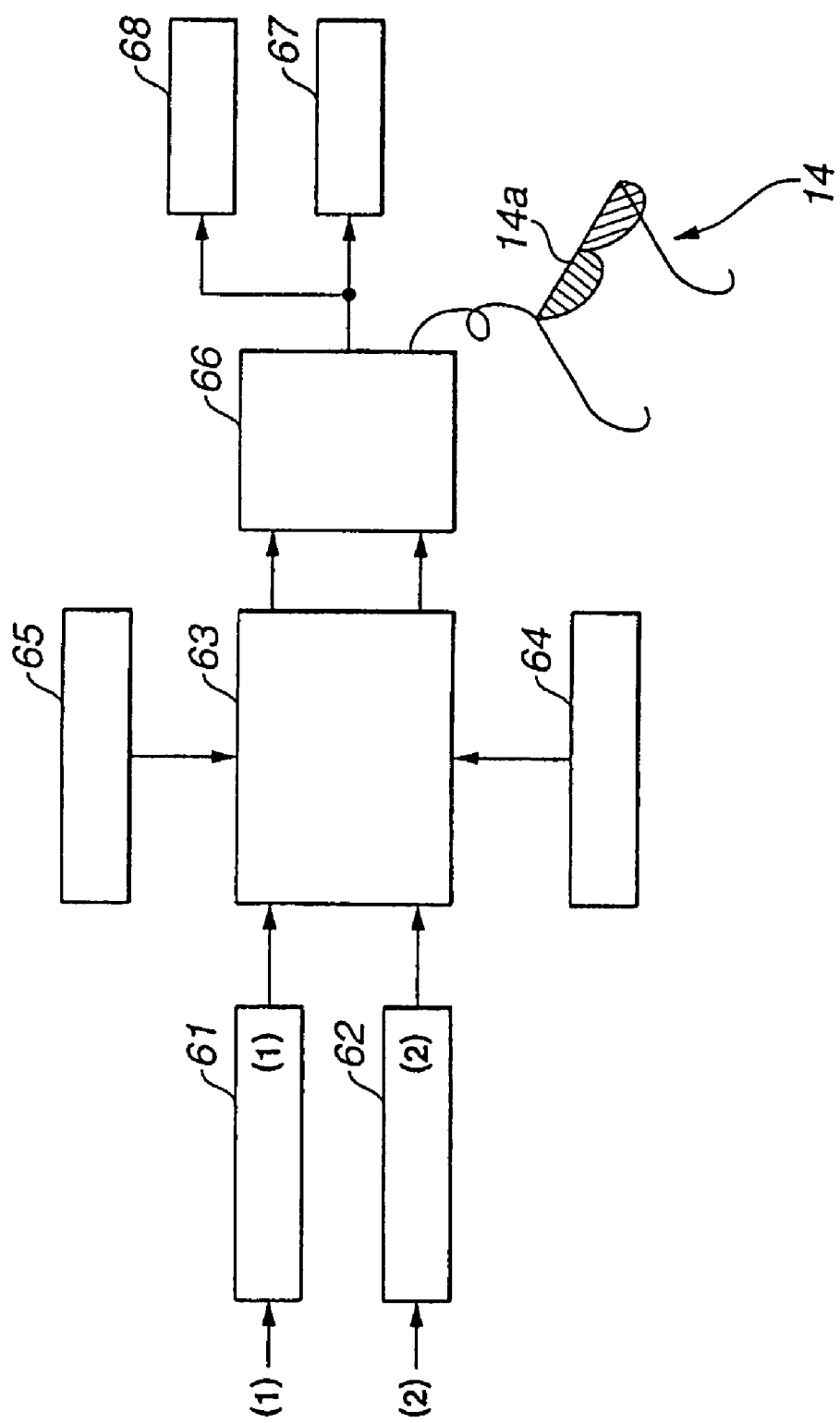

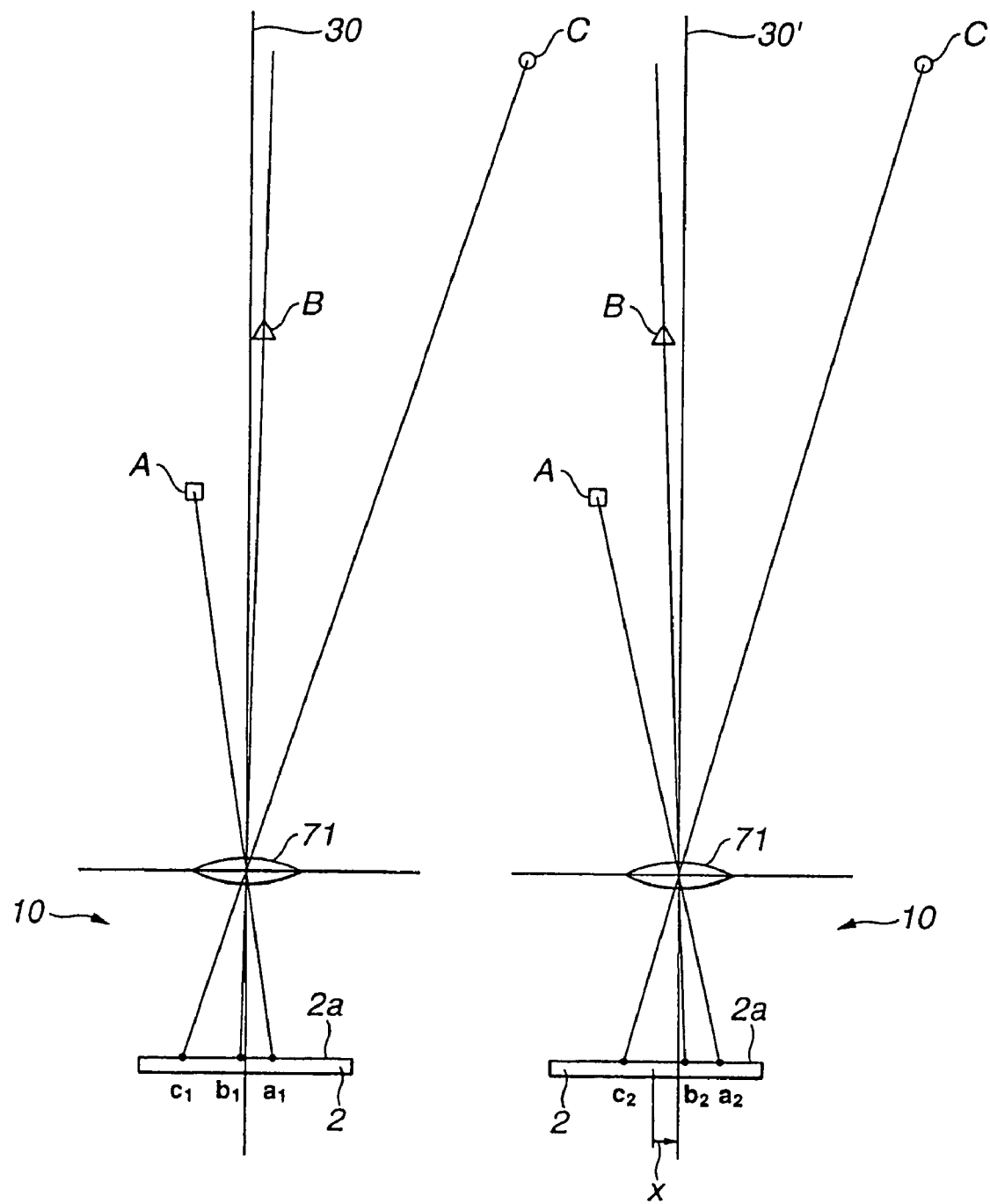

THREE-DIMENSIONAL IMAGE PRODUCING METHOD AND APPARATUS THEREFOR

TECHNICAL FIELD

The present invention relates to a stereoscopic-image generating method and apparatus, and particularly, to a stereoscopic-image pickup apparatus for obtaining stereoscopic images and a signal processing method and apparatus for obtaining stereoscopic images.

BACKGROUND ART

FIG. 22 shows an example of a conventional stereoscopic-image pickup apparatus. FIG. 22 shows the pickup state of a stereoscopic image called horizontal-run body. FIG. 22A and FIG. 22B show the relationship between a camera and a pickup target before movement and the relationship after movement, respectively.

First, an object A and an object B are picked up with a camera 1 before movement (FIG. 22A). The object B is located more distant than the object A. A common axis (shown by one-dot chain line) passing through the objects A, B is perpendicular to a pickup face of a CCD 2 or pickup device. An optical axis (line passing through a lens 3; shown by two-dot chain line) of the camera 1 is away by a distance $l_1$ to the left from the common axis (shown by one-dot chain line). In this state, the object A and the object B form images at $a_1$ and $b_1$ on the pickup face of the CCD 2, respectively.

Then, the camera 1 is moved parallel as shown in FIG. 22B so that the optical axis of the camera 1 is away by the distance $l_1$ to the right from the common axis passing through the objects A, B. In this state, the object A and the object B form images at $a_2$ and $b_2$ on the pickup face of the CCD 2, respectively.

When displaying the images picked up before and after movement of the camera 1 as described above, for example, on a display unit using shutter glasses which control light transmission and interception, the displayed images will be as shown in FIG. 23. In FIG. 23, 11, 12, and 13 designate the image picked up before movement of the camera 1, the image picked up after movement of the camera 1, and the state that these images are displayed alternately (displayed images), respectively.

A shutter 14a is controlled such that a viewer sees the image before movement with his/her left eye L and the image after movement with his/her right eye R. Thus, the object A and the object B are seen as stereoscopic images protruding forward of a screen due to respective parallax.

FIG. 24 shows an example of an apparatus for seeing the stereoscopic images, wherein 20, 21, 22, and 23 designate a video camera, a reproducing unit, a controller, and a display unit, respectively. The above-mentioned images 11 before movement and images 12 after movement are displayed on the display unit 23 to correspond to the even field and the odd field, respectively. The viewer sees the displayed images wearing the shutter glasses 14. The shutter 14a is controlled by the controller 22 such that light transmission is done for the left eye L and light interception is done for the right eye R at the time of the even field, whereas light interception is done for the left eye L and light transmission is done for the right eye R at the time of the odd field, thus allowing the viewer to see a stereoscopic figure shown in FIG. 24.

In the above-mentioned image pickup of the horizontal-run body, however, it was necessary to accurately parallel-move the camera 1 in the cross direction, leading to difficult pickup. As will be understood from FIG. 23, the objects A, B are seen as protruding from a display surface (point at infinity on the display surface), which is visually unnatural, resulting in fatigue.

DISCLOSURE OF THE INVENTION

An object of the present invention is to provide a stereoscopic-image generating method and apparatus which allow pickup of stereoscopically displayed images without accurate movement of a camera or without any movement thereof, and achieve natural stereoscopic images without having all images protruding from a display screen and allowing a reduction in sense of fatigue in vision.

The stereoscopic-image generating method of the present invention is characterized by: moving at least one of a first image picked up with a pickup apparatus in a predetermined first state and a second image picked up with the pickup apparatus in a second state different from the first state; and adjusting a position of fusion of an object designated in the first and second images to generate a stereoscopic image.

Moreover, it is characterized in that the second state is the state that the pickup apparatus which carries out pickup in the first state is moved parallel with respect to a pickup face.

Further, it is characterized in that the second state is the state that the pickup apparatus which carries out pickup in the first state is rotated to a position where with any point on an extension of a connecting line connecting the pickup apparatus and a pickup target object on the side of the pickup apparatus as center, an optical axis of the pickup apparatus forms a predetermined angle with respect to the connecting line.

Still further, it is characterized in that condenser-type optical means are dispose between a pickup element of the pickup apparatus and a pickup target object, the condenser-type optical means being movable to any position holding an optical axis parallel to the optical axis of the pickup apparatus, wherein the first state is the state before movement of the condenser-type optical means, and wherein the second state is the state after movement of the condenser-type optical means.

Furthermore, it is characterized in that angle controlling means are dispose between a pickup element of the pickup apparatus and a pickup target object, the angle controlling means controlling an outgoing angle of light emitted to a pickup face of the pickup apparatus, wherein the first state is the state that the outgoing angle of the angle controlling means are controlled at a first angle, and wherein the second state is the state. that the outgoing angle of the angle controlling means are controlled at a second angle different from the first angle.

Further, it is characterized in that the angle controlling means comprise a variable apex-angle prism.

Still further, it is characterized in that light transmitting means with a light entering face and a light exiting face formed parallel to each other are arranged on a path connecting a pickup element of the pickup apparatus and a pickup target object to be insertable at a predetermined angle, wherein the first state is the state that the light transmitting means fail to be inserted on the path, and wherein the second state is the state that the light transmitting means are inserted on the path.

Furthermore, it is characterized in that the light transmitting means comprise a transparent parallel plate.

Moreover, the stereoscopic-image generating apparatus of the present invention is characterized in that it comprises: image moving means for moving at least one of a first image picked up with a pickup apparatus in a predetermined first state and a second image picked up with the pickup apparatus in a second state different from the first state, the image moving means adjusting a position of fusion of an object designated in the first and second images to generate a stereoscopic image.

Further, it is characterized in that it comprises frame-image generating means for generating a frame image based on the moved at least one of the first and second images.

Still further, it is characterized in that it comprises shift-amount setting means for setting a shift amount of the first and second images.

Furthermore, it is characterized in that it comprises mode selecting means for selecting a shift mode of the first and second images.

Further, it is characterized in that the second state is the state that the pickup apparatus which carries out pickup in the first state is moved parallel with respect to a pickup face.

Still further, it is characterized in that the second state is the state that the pickup apparatus which carries out pickup in the first state is rotated to a position where with any point on an extension of a connecting line connecting the pickup apparatus and a pickup target object on the side of the pickup apparatus as center, an optical axis of the pickup apparatus forms a predetermined angle with respect to the connecting line.

Furthermore, it is characterized in that condenser-type optical means are dispose between a pickup element of the pickup apparatus and a pickup target object, the condenser-type optical means being movable to any position holding an optical axis parallel to the optical axis of the pickup apparatus, wherein the first state is the state before movement of the condenser-type optical means, and wherein the second state is the state after movement of the condenser-type optical means.

Moreover, it is characterized in that angle controlling means are dispose between a pickup element of the pickup apparatus and a pickup target object, the angle controlling means controlling an outgoing angle of light emitted to a pickup face of the pickup apparatus, wherein the first state is the state that the outgoing angle of the angle controlling means are controlled at a first angle, and wherein the second state is the state. that the outgoing angle of the angle controlling means are controlled at a second angle different from the first angle.

Further, it is characterized in that the angle controlling means comprise a variable apex-angle prism.

Still further, it is characterized in that light transmitting means with a light entering face and a light exiting face formed parallel to each other are arranged on a path connecting a pickup element of the pickup apparatus and a pickup target object to be insertable at a predetermined angle, wherein the first state is the state that the light transmitting means fail to be inserted on the path, and wherein the second state is the state that the light transmitting means are inserted on the path.

Furthermore, it is characterized in that the light transmitting means comprise a transparent parallel plate.

BRIEF DESCRIPTION OF THE DRAWINGS

FIG. 1 is a schematic view of a horizontal-run body, depicting an embodiment of the present invention;

FIG. 9 is a block diagram showing an embodiment of a stereoscopic-image generating apparatus of the present invention;

FIG. 10 is a schematic view of body pickup using a transversely moving lens, depicting still another embodiment of the present invention;

FIG. 21 depicts a constructive example of the transparent parallel plate used in the present invention, wherein

BEST MODE FOR CARRYING OUT THE INVENTION

Figure 2A:
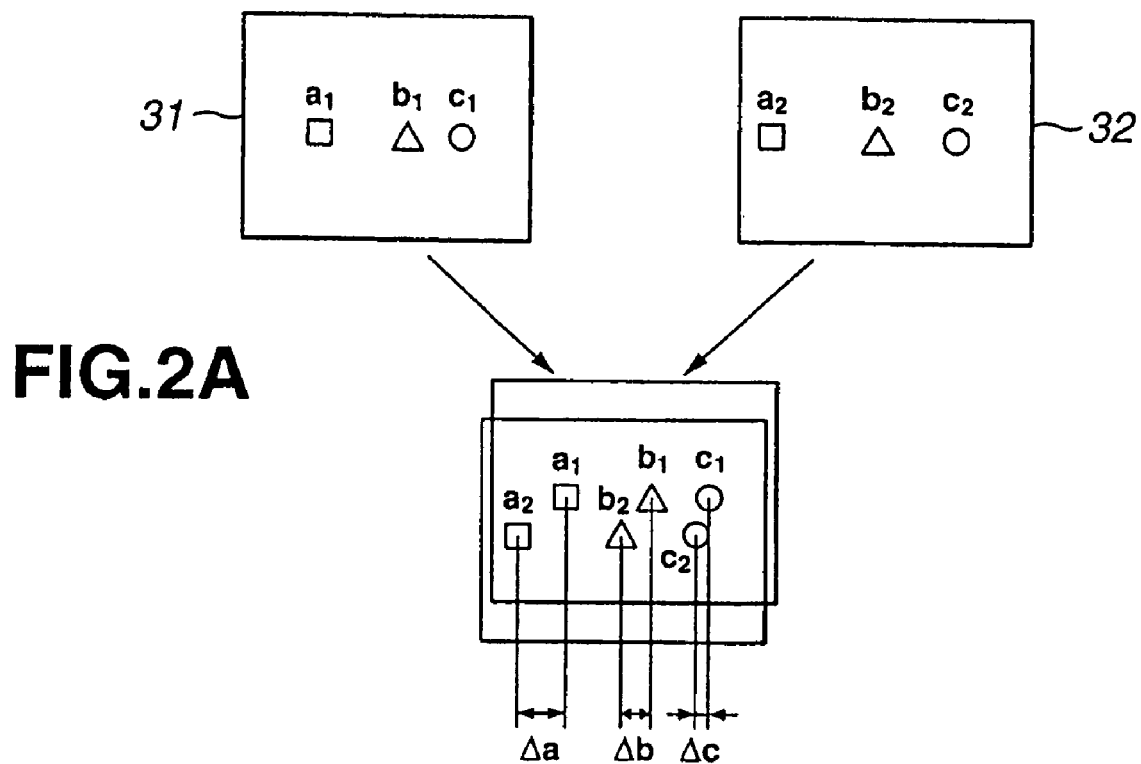
FIG. 2 is an explanatory view showing a conventional stereoscopic image in horizontal-run body pickup.
Figure 2B:
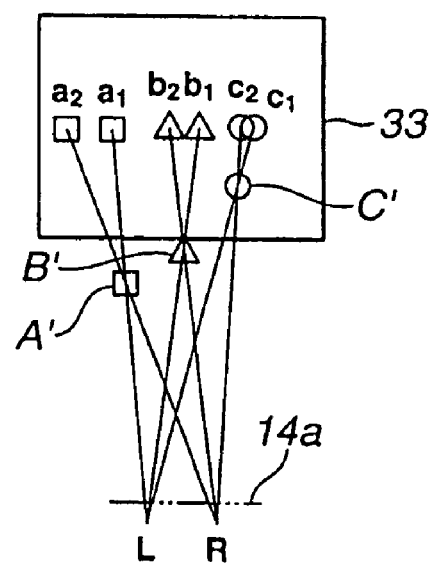
Figure 3A:
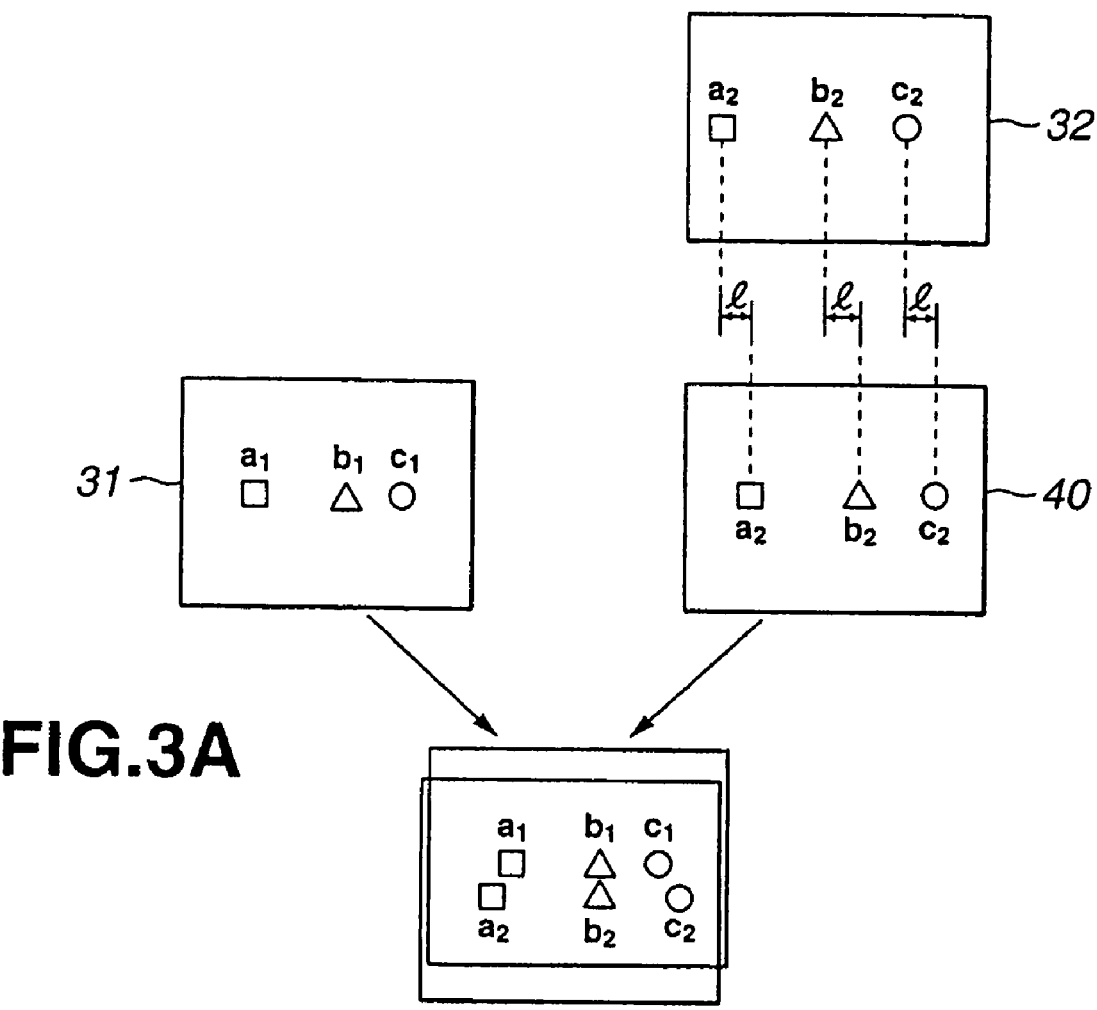
FIG. 3 is an explanatory view depicting that a natural stereoscopic image is obtained in horizontal-run body pickup according to the present invention.
Figure 11A:
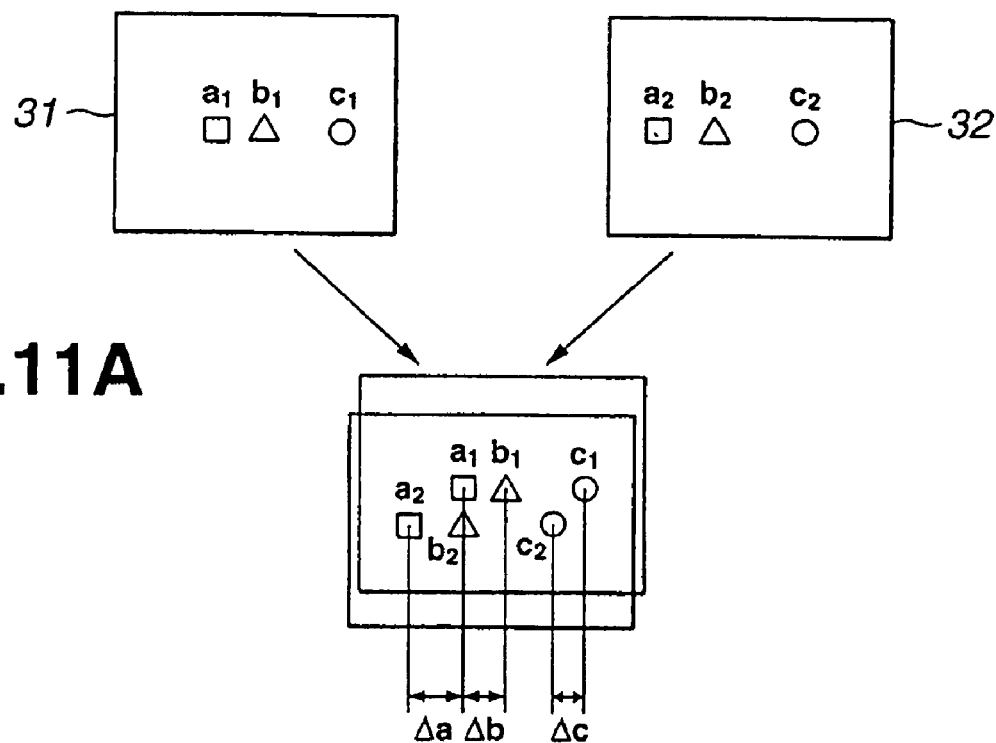
FIG. 11 is an explanatory view depicting that pickup is possible using the transversely moving lens.
Figure 11B:
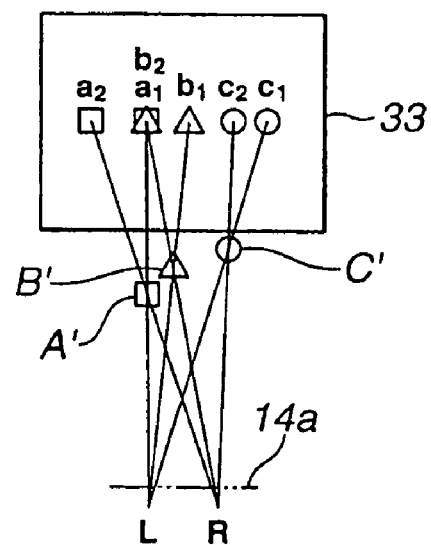
Figure 12A:
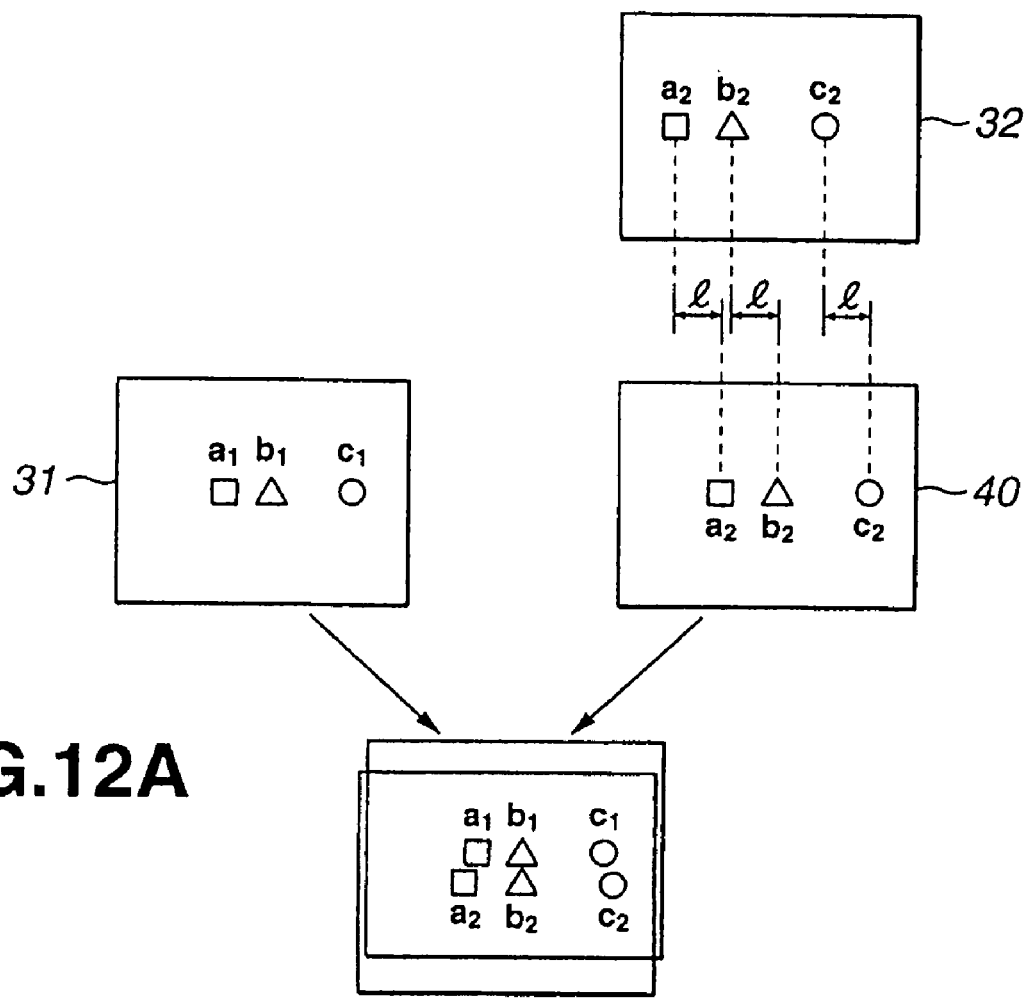
FIG. 12 is an explanatory view depicting that a natural stereoscopic image is obtained according to the present invention.

Embodiments of the present invention will be described hereafter with reference to the accompanying drawings. FIGS. 1–3 show a first embodiment, FIGS. 4–8 show a second embodiment, FIG. 9 shows a block diagram of a stereoscopic-image generating apparatus of the present invention, FIGS. 10–12 show a third embodiment, FIGS. 13–17 show a fourth embodiment, and FIGS. 18–21 show a fifth embodiment.

First Embodiment

FIG. 1 depicts the pickup state when the present invention is applied to a stereoscopic image called horizontal-run body, wherein FIG. 1A shows the relationship between a camera and a pickup target before movement, and FIG. 1B shows the relationship between the camera and the pickup target after movement.

First, before movement (FIG. 1A), pickup target objects A, B, C are picked up with a camera 1. The object B is located more distant than the object A, and the object C is located more distant than the object B. An optical axis (line passing through a lens 3; shown by one-dot chain line) 30 of the camera 1 is positioned between the pickup target objects A, B. In this state, the pickup target objects A, B, C form images at $a_1$, $b_1$, $c_1$ on a pickup face 2a of a CCD 2, respectively.

Next, the camera 1 is moved parallel as shown in FIG. 1B so that the optical axis of the camera 1 is positioned between the pickup target objects B, C. In this state, the pickup target objects A, B, C form images at $a_2$, $b_2$, $c_2$ on the pickup face 2a of the CCD 2, respectively.

FIG. 2 shows formation of a stereoscopic image based on the pickup information wherein 31 is an image (first image) picked up before moving the camera 1, and 32 is an image (second image) picked up after moving the camera 1. The pickup target objects A, B, C have been moved on a display screen (or on the pickup face) by Äa, Äb, Äc, respectively. 33 is a stereovision in the above-mentioned state, wherein all the objects are seen in such a way as to protrude forward in positions A', B', C' due to respective parallax.

Figure 24:
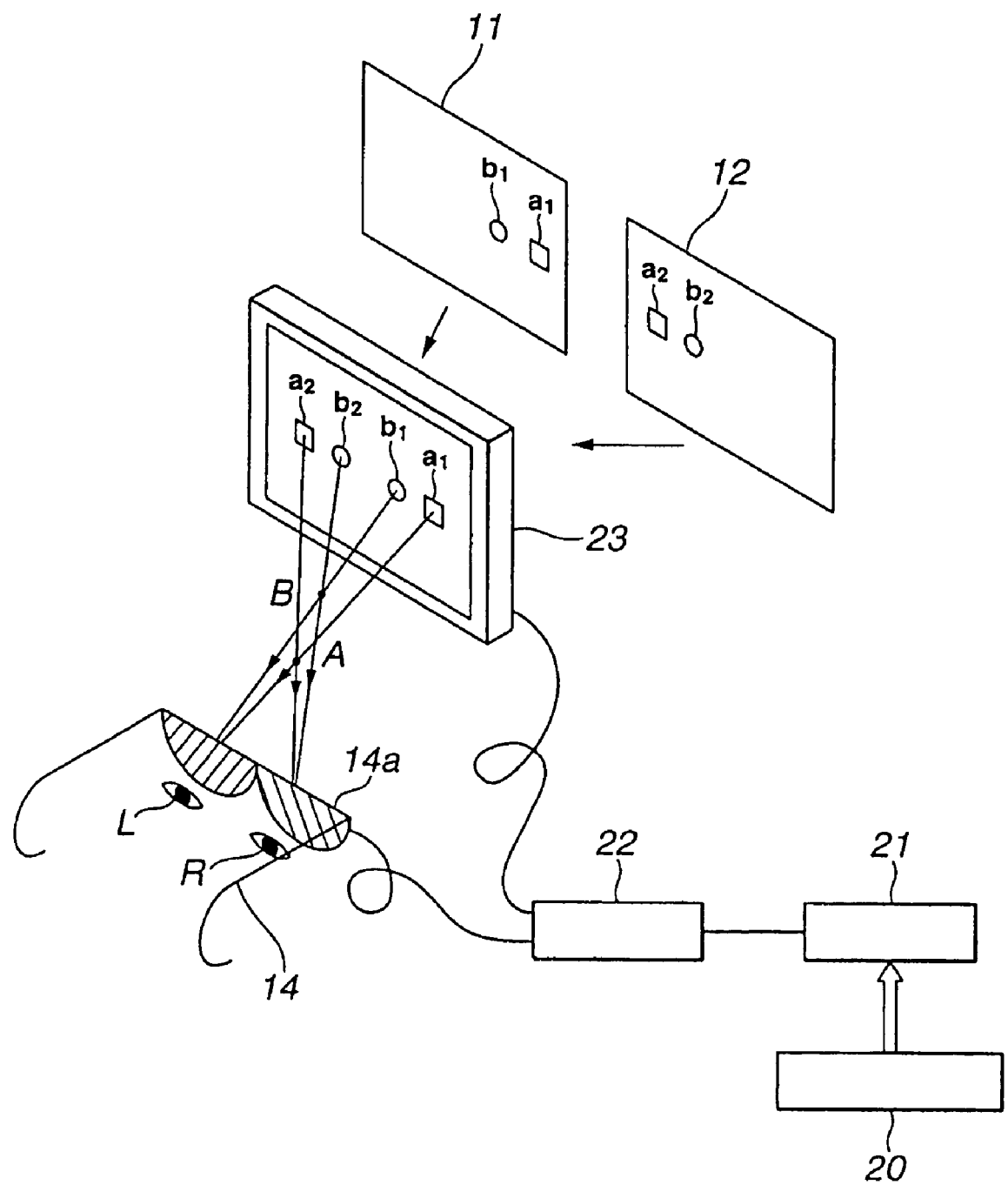
FIG. 24 is a block diagram showing an example of an apparatus for seeing a stereoscopic figure.

According to the present invention, the above phenomenon that all the pickup target objects A, B, C are seen in such a way as to protrude forward is corrected by the method as shown in FIG. 3. Specifically, in order that the formed image $b_2$, for example, of the image 32 after movement of the camera 1 may coincide with the formed image $b_1$ of the image 31 before movement, the image 32 is moved in the cross direction to obtain a corrected image (shift image) 40. Those images 31 and 40 are used and displayed on a display unit as depicted, e.g. in FIG. 24, allowing their viewing as a stereoscopic image.

Figure 3B:
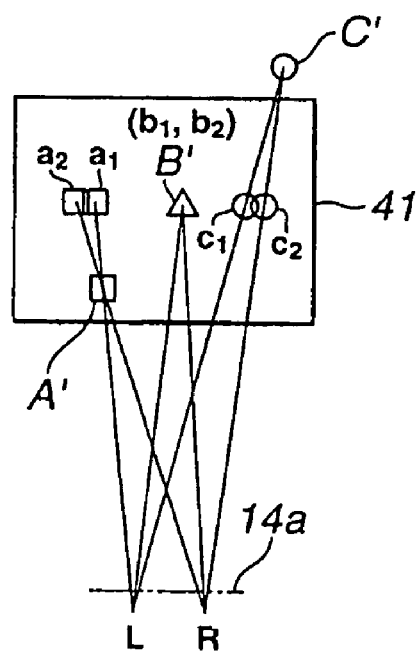

In FIG. 3B, 41 depicts the state that the images 31 and 40 are displayed alternately. Transmission and interception of light for a shutter 14a are controlled so that a viewer's left eye L can see the formed images $a_1$, $b_1$, $c_1$ of the image 31 picked up before movement of the camera 1, and a viewer's right eye R can see $a_2$, $b_2$, $c_2$ of the corrected image 40 obtained by moving the image 32 picked up after movement of the camera 1 in the cross direction.

In such a way, in order that $b_2$, for example, of the image 32 after movement of the camera 1 may coincide with $b_1$ of the image 31 before movement, the image 32 is moved in the cross direction to obtain corrected image 40. Displaying of those images 31, 40 allows adjustment of the position of fusion of an object designated in the images, which allows viewing as if the pickup target object A is in the position A' in the front of the screen, the pickup target object B is in the position B' on the screen, and the pickup target object C is in the position C' in the rear of the screen.

Therefore, there is no occurrence of the phenomenon that all the pickup target objects A, B, C are seen in such a way as to protrude forward as in the prior art, obtaining a natural stereoscopic image, resulting in possible reduction or elimination of a sense of fatigue in vision.

In place of making the formed images $b_1$, $b_2$ of the object B coincide with each other, any other objects (e.g. $a_1$, $a_2$ or $c_1$, $c_2$) may be made coincide with each other. Moreover, the image 31 picked up before movement of the camera 1 may be moved (to obtain corrected image) so as to conform to the image picked up after movement of the camera 1. Naturally, both the images 31, 32 may be moved together.

Second Embodiment

The fact that rotating the camera provides a stereoscopic image based on the images before and after rotation is confirmed by the inventors and the like. Application of the present invention to provision of a stereoscopic image by rotation can achieve more preferred stereoscopic image in the same way as the horizontal-run body.

Figure 4A:
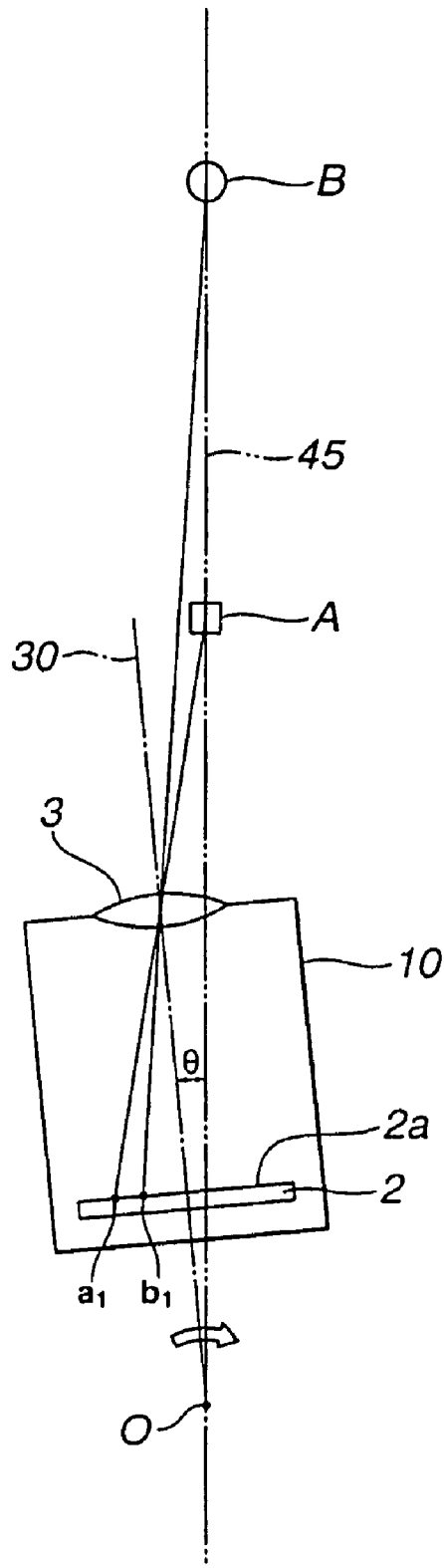
FIG. 4 is a schematic view of rotating body pickup, depicting another embodiment of the present invention.

FIG. 4 is a schematic drawing of body pickup wherein when having two pickup target objects A, B, a camera 10 is rotated to obtain a stereoscopic image. FIG. 4A shows the relationship between the pickup target objects A, B and the camera 10 before rotation, wherein a center of rotation O of the camera 10 is assumed to be on an axis 45 passing through the pickup target objects A, B in the direction from the lens 3 to the CCD 2.

First, before rotation, the optical axis 30 of the camera 10 swings to the left with the point O as center of rotation and with an angle è with respect to the axis 45 passing through the pickup target objects A, B. The pickup target objects A, B form images at $a_1$, $b_1$ on the pickup face 2a of the CCD 2, respectively.

Figure 4B:
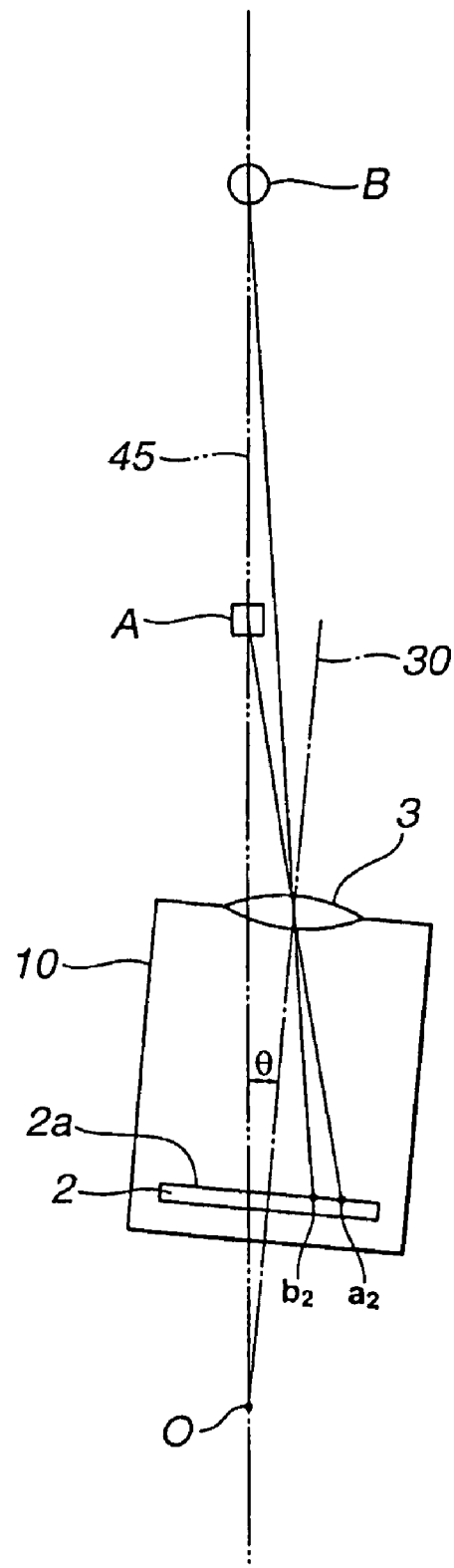

Next, the camera 10 is rotated as shown in FIG. 4B so that the optical axis 30 swings to the right with the point O as center of rotation and with the angle è with respect to the axis 45. At this time, the pickup target objects A, B form images at $a_2$, $b_2$ on the pickup face 2a of the CCD 2, respectively.

Figure 5A:
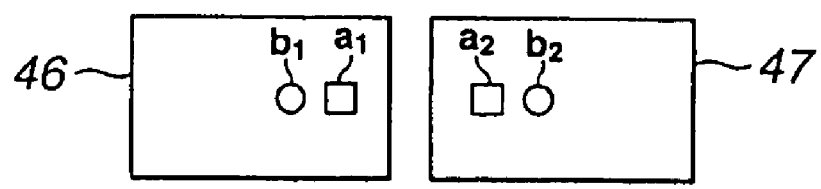
FIG. 5 is an explanatory view showing a conventional stereoscopic image in rotating body pickup.
Figure 5B:
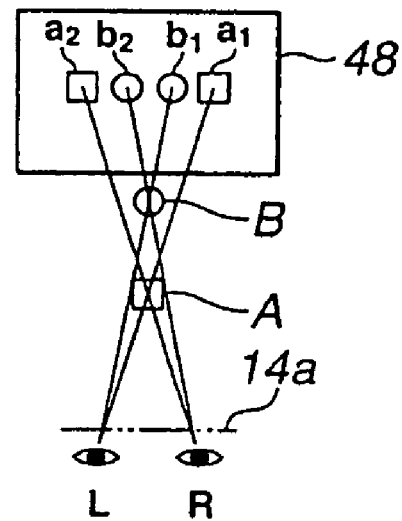

FIG. 5 shows formation of a stereoscopic image based on the pickup information wherein 46 is an image (first image) picked up before moving the camera 10, and 47 is an image (second image) picked up after moving the camera 10. 48 depicts the state that the images 46 and 47 are displayed alternately. A viewer is controlled by the shutter 14a to see the image before rotation by his/her left eye L, and the image after rotation by his/her right eye R. With this, the objects A, B are seen as a stereoscopic image protruding forward. The apparatus of FIG. 24 serves as an apparatus for seeing a stereoscopic image, for example.

Figures 6A, 6B:
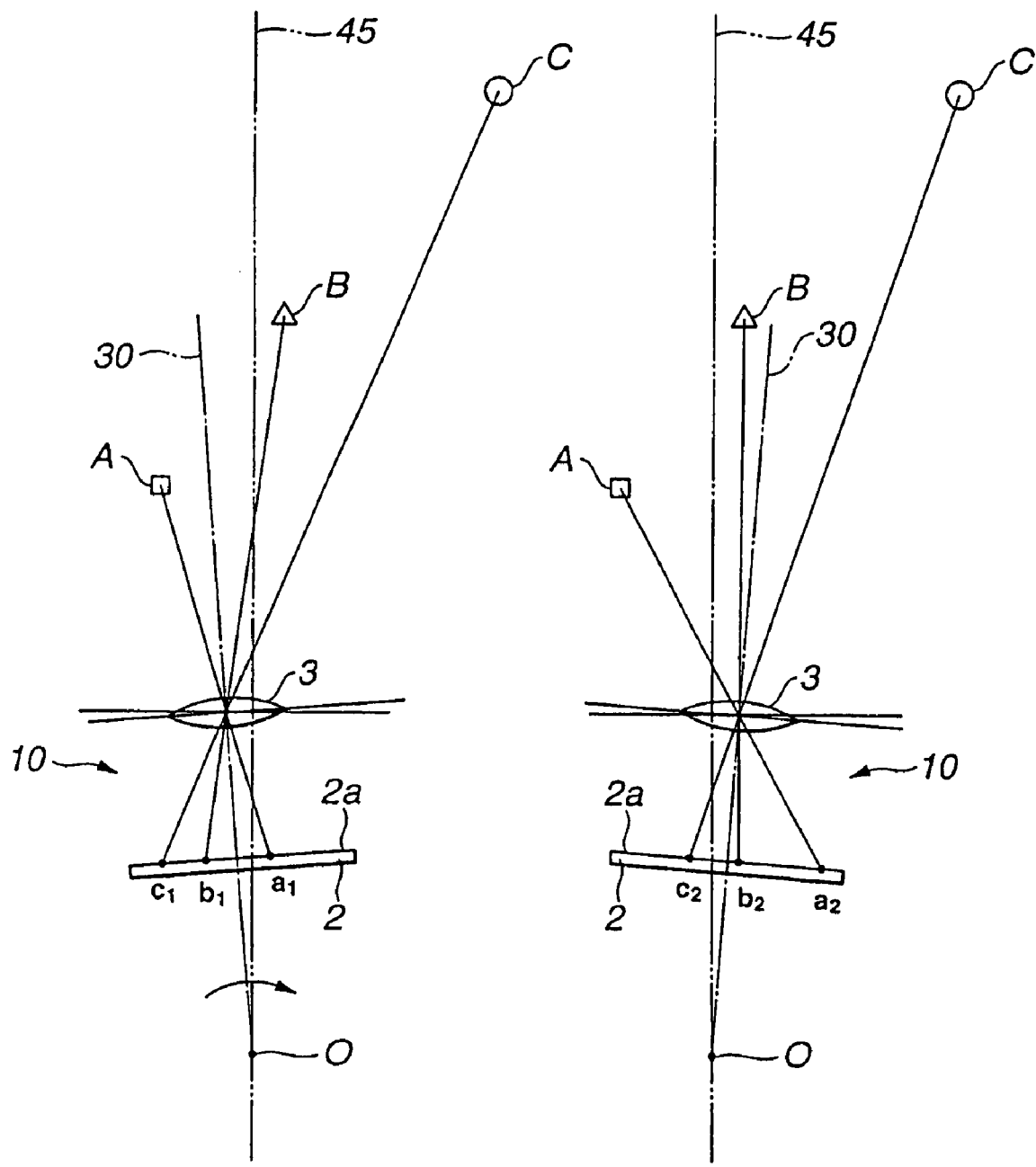
FIG. 6 is a schematic view of rotating body pickup, depicting still another embodiment of the present invention.

FIG. 6 shows a manner of obtaining a stereoscopic image by rotating the camera 10 when having three pickup target objects A, B, C. FIG. 6A shows the relationship between the pickup target objects A, B, C and the camera 10 before rotation, wherein the center of rotation O of the camera 10 is assumed to be on the axis 45 passing through a position between the pickup target objects A, B and the camera 10 in the direction from the lens 3 to the CCD 2.

First, before rotation, the optical axis 30 of the camera 10 swings to the left with the point O as center of rotation and with the angle è with respect to the axis 45. The pickup target objects A, B, C form images at $a_1$, $b_1$ on the pickup face 2a of the CCD 2, respectively.

Next, the camera 10 is rotated as shown in FIG. 6B so that the optical axis 30 swings to the right with the point O as center of rotation and with angle è with respect to the axis 45. At this time, the pickup target objects A, B, C form images at $a_2$, $b_2$, $c_2$ on the pickup face 2a of the CCD 2, respectively.

Figure 7A:
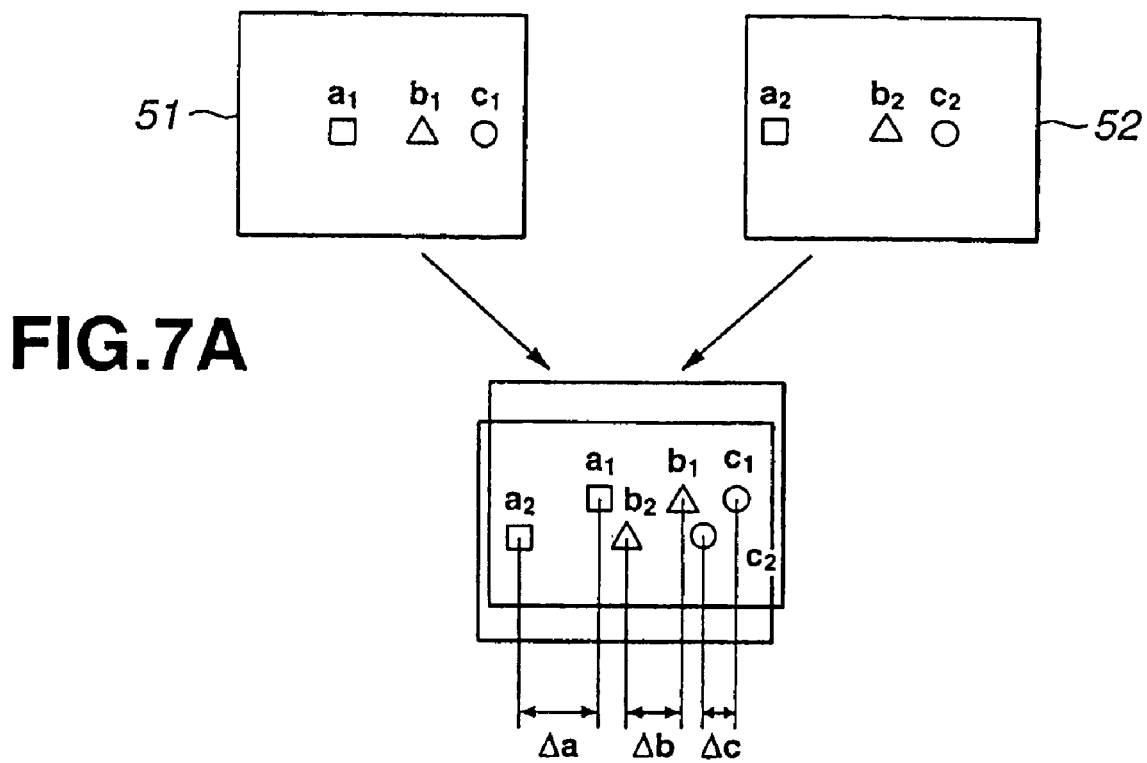
FIG. 7 is an explanatory view showing a conventional stereoscopic image in rotating body pickup.
Figure 7B:
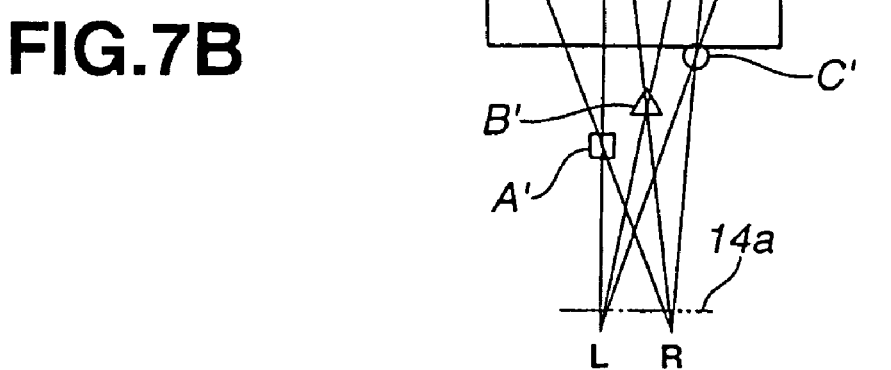

FIG. 7 shows formation of a stereoscopic image based on the pickup information wherein 51 is an image (first image) picked up before movement of the camera 10, and 52 is an image (second image) picked up after movement. The pickup target objects A, B, C have been moved on the display screen (or on the pickup face) by Äa, Äb, Äc, respectively. 53 is a stereovision in the above-mentioned state, wherein all the objects are seen in such a way as to protrude forward in the positions A', B', C' due to respective parallax.

Figure 8A:
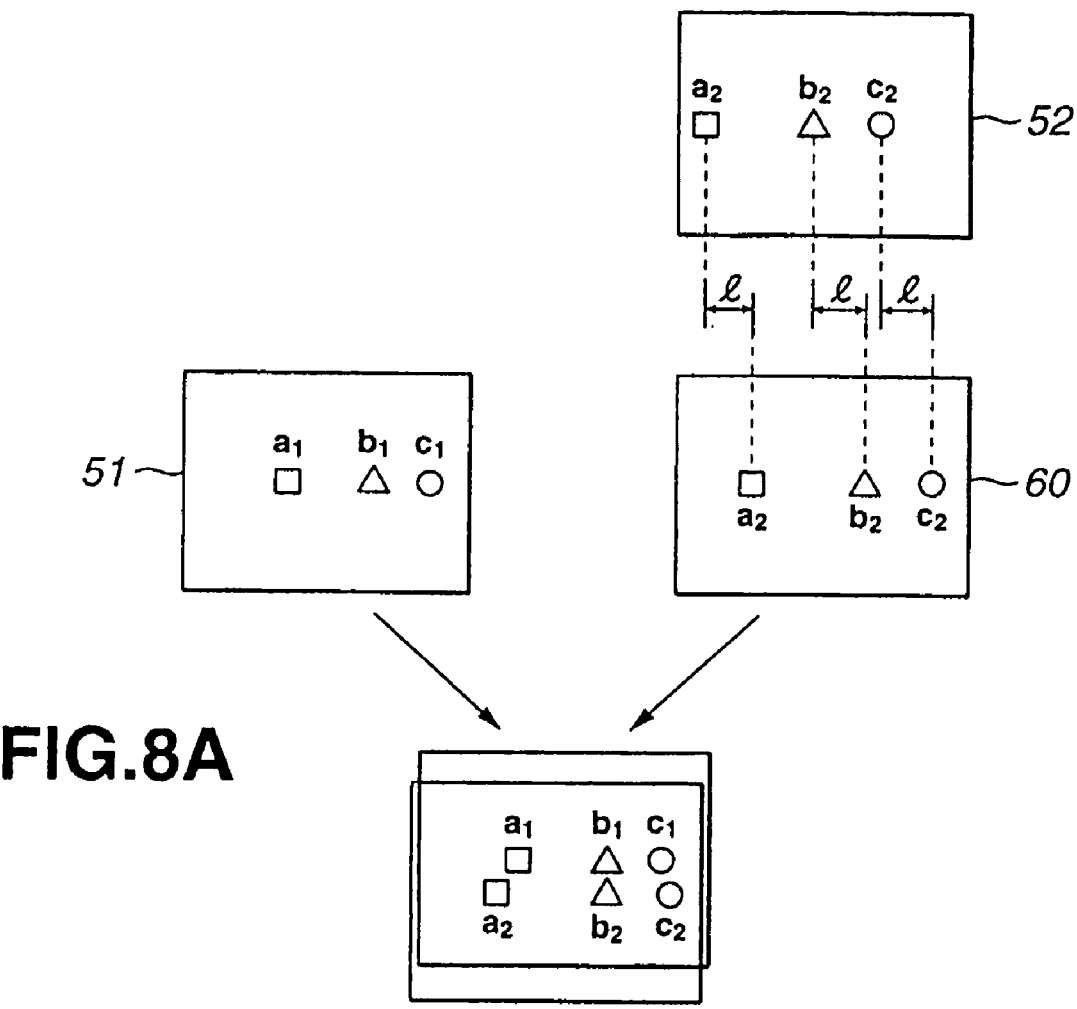
FIG. 8 is an explanatory view depicting that a natural stereoscopic image is obtained in rotating body pickup according to the present invention.

According to the present invention, the above phenomenon that all the pickup target objects A, B, C are seen in such a way as to protrude forward is corrected by the method as shown in FIG. 8. Specifically, in order that the formed image $b_2$, for example, of the image 52 after movement of the camera 1 may coincide with the formed image $b_1$ of the image 51 before movement, the image 52 is moved in the cross direction to obtain a corrected image (shift image) 60. Those images 51 and 60 are used and displayed on the display unit as depicted, e.g. in FIG. 24, allowing their viewing as a stereoscopic image.

Figure 8B:
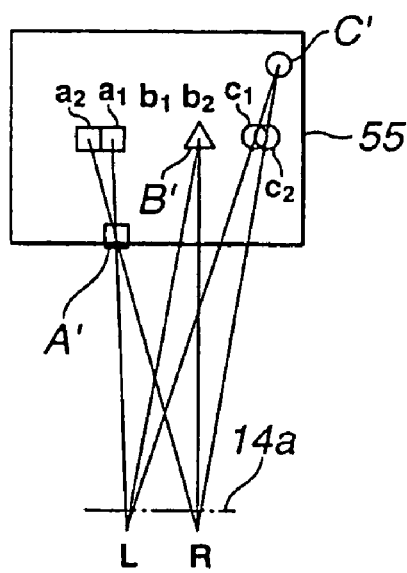

In FIG. 8B, 55 depicts the state that the images 51 and 60 are displayed alternately. Transmission and interception of light for the shutter 14a are controlled so that the viewer's left eye L can see the formed images $a_1$, $b_1$, $c_1$ of the image 51 picked up before movement of the camera 10, and the viewer's right eye R can see $a_2$, $b_2$, $c_2$ of the corrected image 60 obtained by moving the image 52 picked up after movement in the cross direction.

In such a way, in order that $b_2$, for example, of the image 52 after movement of the camera 10 may coincide with $b_1$ of the image 51 before movement, the image 52 is moved in the cross direction to obtain corrected image 60. Displaying of those images 51, 60 allows adjustment of the position of fusion of an object designated in the images, which allows viewing as if the pickup target object A is in the position A' in the front of the screen, the pickup target object B is in the position B' on the screen, and the pickup target object C is in the position C' in the rear of the screen.

Therefore, there is no occurrence of the phenomenon that all the pickup target objects A, B, C are seen in such a way as to protrude forward as in the prior art, obtaining a natural stereoscopic image, resulting in possible reduction or elimination of a sense of fatigue in vision.

In place of making the formed images $b_1$, $b_2$ of the object B coincide with each other, any other objects (e.g. $a_1$, $a_2$ or $c_1$, $c_2$) may be made coincide with each other. Moreover, the image 51 picked up before movement of the camera 10 may be moved (to obtain corrected image) so as to conform to the image picked up after movement. Naturally, both the images 51, 52 may be moved together.

Next, a constructive example of the stereoscopic-image generating apparatus based on the stereoscopic-image generating method of the present invention will be described with reference to a block diagram of FIG. 9. First, the image 31 or 51, for example, picked up before parallel movement of the camera or before rotation thereof is stored in an image memory 61 as an image signal (1), whereas the image 32 or 52, for example, picked up after parallel movement of the camera or after rotation thereof is stored in an image memory 62 as an image signal (2).

An image shift circuit 63 is a circuit which shifts (e.g. in the cross direction) an object noted in the image signals (1), (2) of the image memories 61, 62 to be in the same position on the display screen, wherein shift control is carried out based on a shift amount indicated from the outside by a shift-amount input device 64, and a shift mode indicated from the outside by mode selecting means 65 (mode for shifting the image signal (1) with respect to the image signal (2), mode for shifting the image signal (2) with respect to the image signal (1), mode for shifting both of (1) and (2), etc.), adjusting the position of fusion of an object picked up before parallel movement of the camera or before rotation thereof and an object picked up after parallel movement of the camera or after rotation thereof.

The image signals (1) and (2) with shift amount adjusted are input to a frame-signal generating device 66 wherein a television signal is generated having the image signals (1), (2) corresponding to even and odd fields, respectively. At this time, the frame-signal generating device 66 outputs a signal for switching the shutter 14a of shutter eyeglasses 14 in correspondence with field switching, opening and closing the shutter 14a for right and left eyes.

The television signal out of the frame-signal generating device 66 is input and displayed on a display unit 67, which is seen through the shutter 14a for obtaining a stereoscopic image. Moreover, the television signal output from the frame-signal generating device 66 can be recorded and stored in a recording medium through a recording device 68.

Third Embodiment

FIG. 10 is a schematic drawing of body pickup wherein pickup is carried out using, as movable condenser-type optical means, a mobile lens 71 formed out of a convex lens. In FIG. 10, the mobile lens 71 for the camera 10 is movably (in the cross direction in the drawing) disposed between the pickup face 2a of the CCD or pickup element 2 and the pickup target objects A, B, C in any position holding an optical axis 30' parallel with respect to the optical axis 30 of the camera 10.

FIG. 10A shows the state before moving the mobile lens 71, wherein the pickup target objects A, B, C form images at $a_1$, $b_1$, $c_1$ on the pickup face 2a, respectively. FIG. 10B shows the state that the mobile lens 71 is moved by a displacement x, wherein the pickup target objects A, B, C form images at $a_2$, $b_2$, $c_2$ on the pickup face 2a, respectively.

FIG. 11 shows formation of a stereoscopic image based on the pickup information wherein 31 is an image (first image) picked up before moving the camera 1, and 32 is an image (second image) picked up after moving the camera 1. The pickup target objects A, B, C have been moved on the display screen (or on the pickup face) by Äa, Äb, Äc, respectively. 33 is a stereovision in the above-mentioned state, wherein all the objects are seen in such a way as to protrude forward in positions A', B', C' due to respective parallax.

According to the present invention, the above phenomenon that all the pickup target objects A, B, C are seen in such a way as to protrude forward is corrected by the method as shown in FIG. 12. Specifically, in order that the formed image $b_2$, for example, of the image 32 after movement of the mobile lens 71 may coincide with the formed image $b_1$ of the image 31 before movement, the image 32 is moved in the cross direction to obtain a corrected image 40. Those images 31 and 40 are used and displayed on the display unit as depicted, e.g. in FIG. 24, allowing their viewing as a stereoscopic image.

Figure 12B:
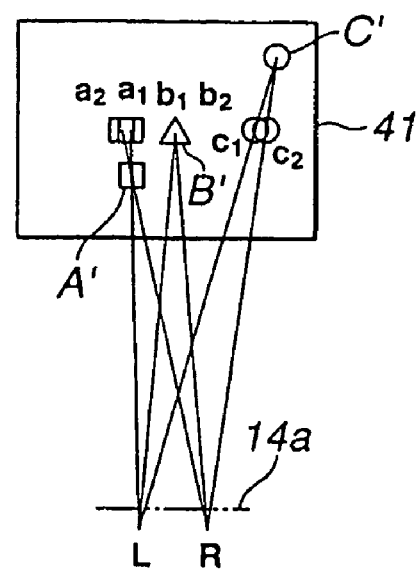

In FIG. 12B, 41 depicts the state that the images 31 and 40 are displayed alternately. Transmission and interception of light for a shutter 14a are controlled so that a viewer's left eye L can see the formed images $a_1$, $b_1$, $c_1$ of the image 31 picked up before movement of the mobile lens 71, and a viewer's right eye R can see $a_2$, $b_2$, $c_2$ of the corrected image 40 obtained by moving the image 32 picked up after movement of the mobile lens 71 in the cross direction.

In such a way, in order that $b_2$, for example, of the image 32 after movement of the mobile lens 71 may coincide with $b_1$ of the image 31 before movement, the image 32 is moved in the cross direction to obtain corrected image 40. Displaying of those images 31, 40 allows adjustment of the position of fusion of an object designated in the images, which allows viewing as if the pickup target object A is in the position A' in the front of the screen, the pickup target object B is in the position B' on the screen, and the pickup target object C is in the position C' in the rear of the screen.

Therefore, there is no occurrence of the phenomenon that all the pickup target objects A, B, C are seen in such a way as to protrude forward as in the prior art, obtaining a natural stereoscopic image, resulting in possible reduction or elimination of a sense of fatigue in vision.

In place of making the formed images $b_1$, $b_2$ of the object B coincide with each other, any other objects (e.g. $a_1$, $a_2$ or $c_1$, $c_2$) may be made coincide with each other. Moreover, the image 31 picked up before movement of the lens may be moved (to obtain corrected image) so as to conform to the image picked up after movement of the lens. Naturally, both the images 31, 32 may be moved together.

In the same way as described above, using the apparatus of FIG. 9, a stereoscopic image is generated as described above. Specifically, first, the image 31, for example, is stored in an image memory 61 as an image signal (1), whereas the image 32, for example, is stored in an image memory 62 as an image signal (2).

An image shift circuit 63 is a circuit which shifts (e.g. in the cross direction) an object noted in the image signals (1), (2) of the image memories 61, 62 to be in the same position on the display screen, wherein shift control is carried out based on a shift amount indicated from the outside by a shift-amount input device 64, and a shift mode indicated from the outside by mode selecting means 65 (mode for shifting the image signal (1) with respect to the image signal (2), mode for shifting the image signal (2) with respect to the image signal (1), mode for shifting both of (1) and (2), etc.), adjusting the position of fusion of an object picked up before parallel movement of the camera or before rotation thereof and an object picked up after parallel movement of the camera or after rotation thereof.

The image signals (1) and (2) with shift amount adjusted are input to a frame-signal generating device 66 wherein a television signal is generated having the image signals (1), (2) corresponding to even and odd fields, respectively. At this time, the frame-signal generating device 66 outputs a signal for switching the shutter 14a of shutter eyeglasses 14 in correspondence with field switching, opening and closing the shutter 14a for right and left eyes.

The television signal out of the frame-signal generating device 66 is input and displayed on a display unit 67, which is seen through the shutter 14a for obtaining a stereoscopic image. Moreover, the television signal output from the frame-signal generating device 66 can be recorded and stored in a recording medium through a recording device 68.

In the embodiment, the mobile lens 71 formed out of a convex lens is used as movable condenser-type optical means. Instead, other optical means having similar function may be used.

Fourth Embodiment

FIG. 13 is a schematic drawing of body pickup wherein pickup is carried out using a variable apex-angle prism as angle controlling means for controlling an outgoing angle of light. In FIG. 13, a prism 73 (73') which can change the apex angle is disposed between the lens 3 of the camera and the pickup target objects A, B, C and on the optical axis 30 of the camera.

Figure 13A:
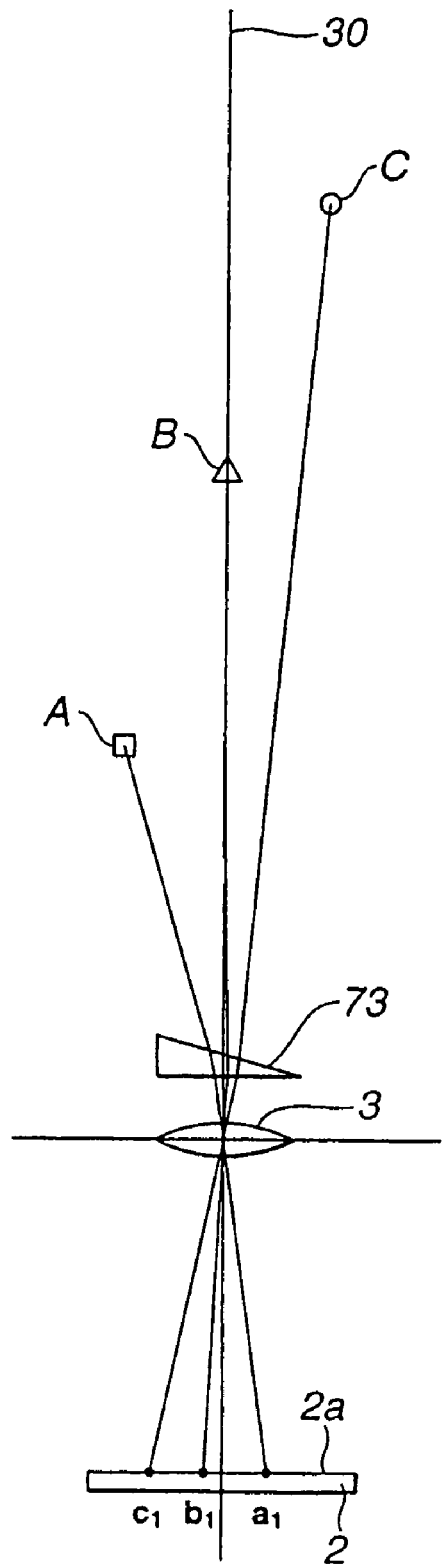
FIG. 13 is a schematic view of body pickup using a variable apex-angle lens, depicting a further embodiment of the present invention.
Figure 13B:
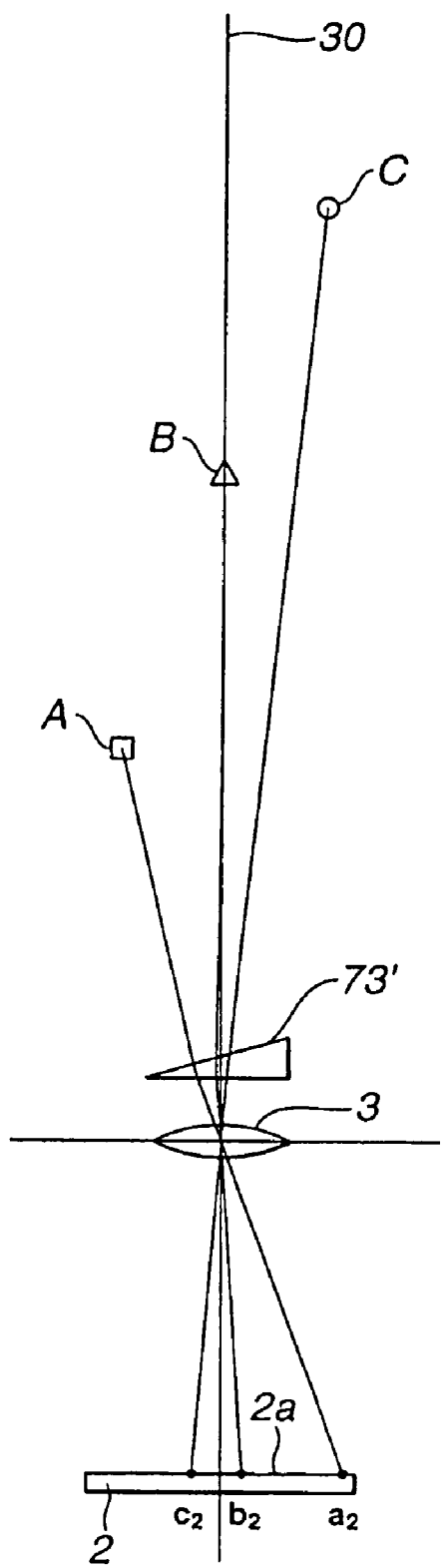

FIG. 13A shows the state that the apex angle of the prism (73) is disposed rightward (refer hereafter to as first state), wherein the pickup target objects A, B, C form images at $a_1$, $b_1$, $c_1$ on the pickup face 2a of the CCD 2, respectively. FIG. 13B shows the state that the apex angle of the prism (73') is disposed leftward (refer hereafter to as second state), wherein the pickup target objects A, B, C form images at $a_2$, $b_2$, $c_2$ on the pickup face 2a of the CCD 2, respectively.

Figure 14A:
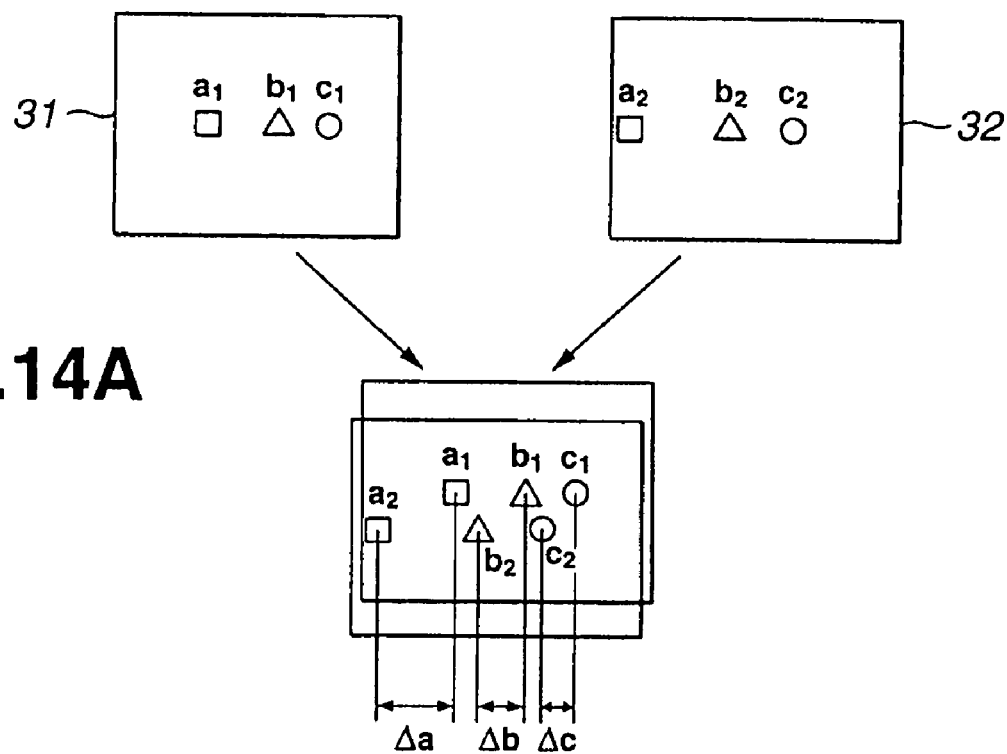
FIG. 14 is an explanatory view depicting that pickup is possible using the variable apex-angle prism.
Figure 14B:
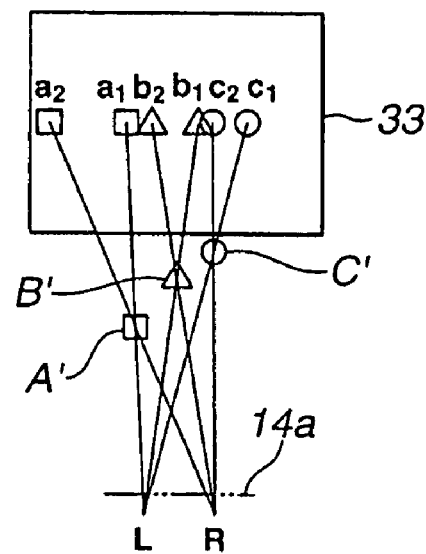

FIG. 14 shows formation of a stereoscopic image based on the pickup information wherein 31 is an image (first image) picked up when the prism 73 is in the first state, and 32 is an image (second image) picked up when the prism 73' is in the second state. The pickup target objects A, B, C have been moved on the display screen (or on the pickup face) by Äa, Äb, Äc, respectively. 33 is a stereovision in the above-mentioned state, wherein all the objects are seen in such a way as to protrude forward in positions A', B', C' due to respective parallax.

Figure 15A:
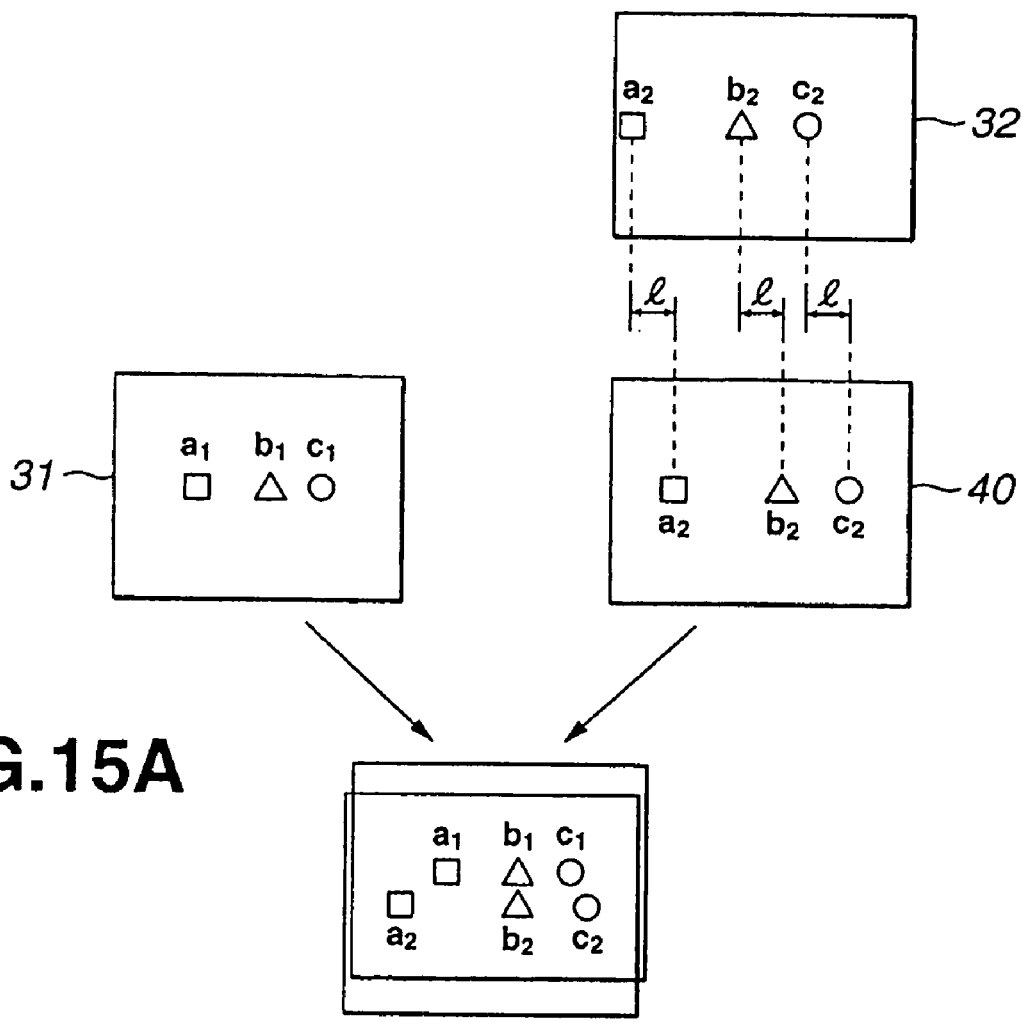
FIG. 15 is an explanatory view depicting that a natural stereoscopic image is obtained according to the present invention.

According to the present invention, the above phenomenon that all the pickup target objects A, B, C are seen in such a way as to protrude forward is corrected by the method as shown in FIG. 15. Specifically, in order that the formed image $b_2$, for example, of the image 32 picked up when the prism 73' is in the second state (FIG. 13B) may coincide with the formed image $b_1$ of the image 31 picked up when the prism 73 is in the first state (FIG. 13A), the image 32 is moved in the cross direction to obtain a corrected image (shift image) 40. Those images 31 and 40 are used and displayed on the display unit as depicted, e.g. in FIG. 24, allowing their viewing as a stereoscopic image.

Figure 15B:
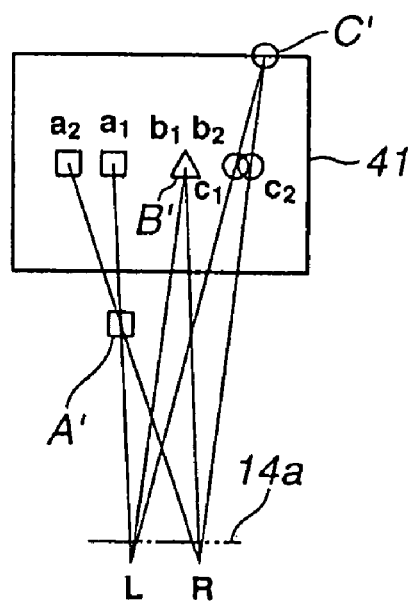

In FIG. 15B, 41 depicts the state that the images 31 and 40 are displayed alternately. Transmission and interception of light for the shutter 14a are controlled so that a viewer's left eye L can see the formed images $a_1$, $b_1$, $c_1$ of the image 31 picked up when the prism 73 is in the first state, and a viewer's right eye R can see $a_2$, $b_2$, $c_2$ of the corrected image 40 obtained by moving the image 32 picked up when the prism 73' is in the second state.

In such a way, in order that $b_2$, for example, of the image 32 picked up when the prism 73' is in the second state may coincide with $b_1$ of the image 31 picked up when the prism 73 is in the first state, the image 32 is moved in the cross direction to obtain corrected image 40. Displaying of those images 31, 40 allows adjustment of the position of fusion of an object designated in the images, which allows viewing as if the pickup target object A is in the position A' in the front of the screen, the pickup target object B is in the position B' on the screen, and the pickup target object C is in the position C' in the rear of the screen.

Therefore, there is no occurrence of the phenomenon that all the pickup target objects A, B, C are seen in such a way as to protrude forward as in the prior art, obtaining a natural stereoscopic image, resulting in possible reduction or elimination of a sense of fatigue in vision.

In place of making the formed images $b_1$, $b_2$ of the object B coincide with each other, any other objects (e.g. $a_1$, $a_2$ or $c_1$, $c_2$) may be made coincide with each other. Moreover, the image 31 picked up when the prism 73 is in the first state may be moved (to obtain corrected image) so as to conform to the image picked up when the prism 73' is in the second state. Naturally, both the images 31, 32 may be moved together.

FIG. 16 shows a first constructive example of the variable apex-angle prism used in the present invention, wherein a space between plate glasses 74a, 74b disposed parallel to each other at a predetermined distance away is filled with a liquid 75, and is hermetically closed by bellows sealing members 76 each disposed at ends of the plate glasses 74a, 74b.

Figure 16A:
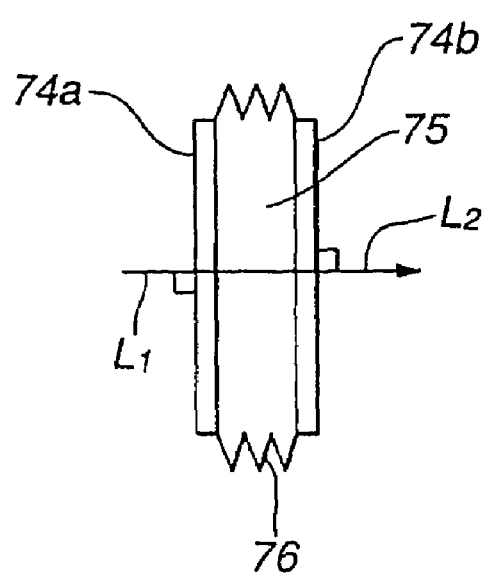
FIG. 16 is a sectional view showing a first constructive example of the variable apex-angle prism used in the present invention.
Figure 16B:
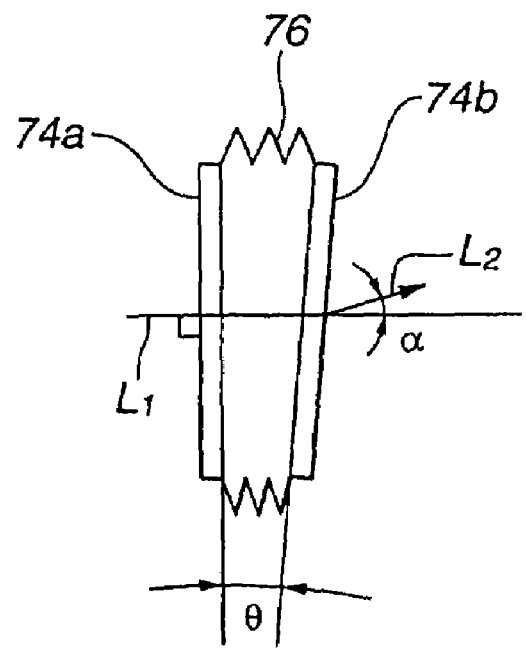

FIG. 16A shows the state that the two plate glasses 74a, 74b are parallel to each other, wherein a light $L_1$ perpendicularly incident on the plate glass 74a travels in a straight line, and exits as a light $L_2$. FIG. 16B shows the state that the two plate glasses 74a, 74b form an angle è (apex angle), wherein the incident light $L_1$ exits at an angle á (light $L_2$). In such a way, the outgoing angle of the outgoing light $L_2$ is controlled by controlling the apex angle of the two plate glasses 74a, 74b.

FIG. 17 shows a second constructive example of the variable apex-angle prism used in the present invention, wherein curved surfaces of a flat concave lens 77 and a flat convex lens 78 having the same curvature are disposed to face each other. One is rotated with respect to another along the curved surface, controlling the state of the planes of the two lenses 77, 78 from the parallel state to the state with a predetermined angle è.

Figure 17A:
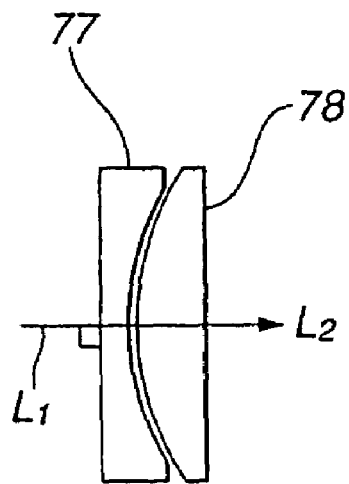
FIG. 17 is a sectional view showing a second constructive example of the variable apex-angle prism used in the present invention.
Figure 17B:
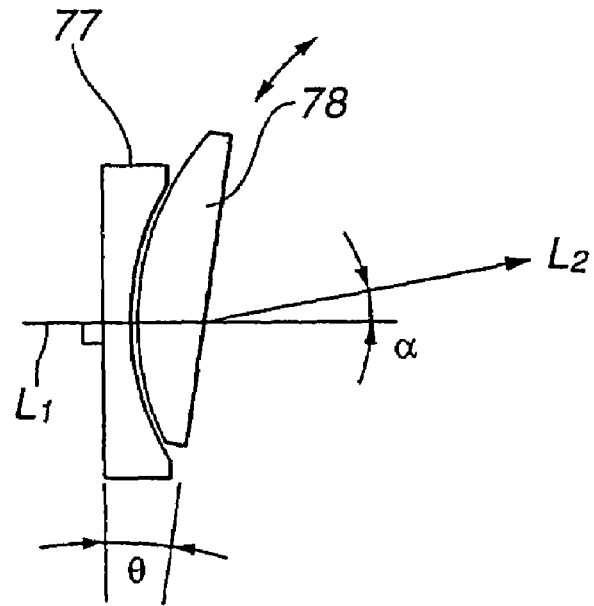

FIG. 17A shows the state that the planes of the two lenses 77, 78 are parallel to each other, wherein the light $L_1$ perpendicularly incident on the flat concave lens 77 travels in a straight line, and exits as light $L_2$. FIG. 17B shows the state that the two lenses 77, 78 form an angle è (apex angle), wherein the incident light $L_1$ exits at an angle á (light $L_2$). In such a way, the outgoing angle of the outgoing light $L_2$ is controlled by controlling the apex angle formed by the planes of the two lenses 77, 78.

In the same way as described above, using the apparatus of FIG. 9, a stereoscopic image is generated as described above. Specifically, first, the image 31, for example, picked up when the prism 73 is in the first state (FIG. 13A) is stored in the image memory 61 as image signal (1), whereas the image 32, for example, picked up when the prism 73' is in the second state (FIG. 13B) is stored in the image memory 62 as image signal (2).

The image shift circuit 63 is a circuit which shifts (e.g. in the cross direction) an object noted in the image signals (1), (2) of the image memories 61, 62 to be in the same position on the display screen, wherein shift control is carried out based on a shift amount indicated from the outside by a shift-amount input device 64, and a shift mode indicated from the outside by mode selecting means 65 (mode for shifting the image signal (1) with respect to the image signal (2), mode for shifting the image signal (2) with respect to the image signal (1), mode for shifting both of (1) and (2), etc.), adjusting the position of fusion of an object picked up when the prism 73 is in the first state and an object picked up when the prism 73' is in the second state.

The image signals (1) and (2) with shift amount adjusted are input to the frame-signal generating device 66 wherein a television signal is generated having the image signals (1), (2) corresponding to even and odd fields, respectively. At this time, the frame-signal generating device 66 outputs a signal for switching the shutter 14a of the shutter eyeglasses 14 in correspondence with field switching, opening and closing the shutter 14a for right and left eyes.

The television signal out of the frame-signal generating device 66 is input and displayed on the display unit 67, which is seen through the shutter 14a for obtaining a stereoscopic image. Moreover, the television signal output from the frame-signal generating device 66 can be recorded and stored in a recording medium through the recording device 68.

In the embodiment, the prisms 73, 73' are disposed between the lens 3 of the camera and the pickup target objects A, B, C. Instead, they may be disposed between the lens 3 of the camera and the pickup face 2a and on the optical axis 30 of the camera.

Moreover, in place of the prisms 73, 73' having variable apex angle, the angle controlling means for controlling the outgoing angle of light emitted to a pickup face of a pickup element of a pickup apparatus may be other means having similar function.

Fifth Embodiment

FIG. 18 shows a schematic drawing of body pickup wherein pickup is carried out using a transparent parallel plate as light transmitting means. In FIG. 18, 83 is a transparent parallel plate which is disposed in the insertable and exludable way on the optical axis 30 of the camera on a path connecting the lens 3 of the camera and the pickup target objects A, B, C.

Figure 18A:
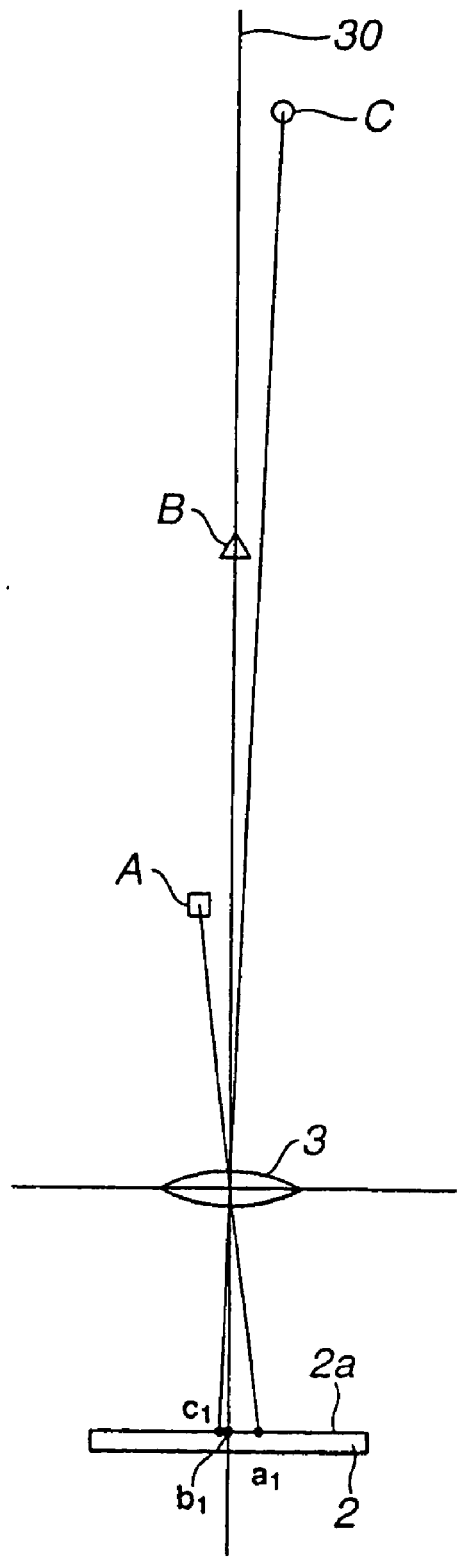
FIG. 18 is a schematic view of body pickup using a transparent parallel plate, depicting a further embodiment of the present invention.
Figure 18B:
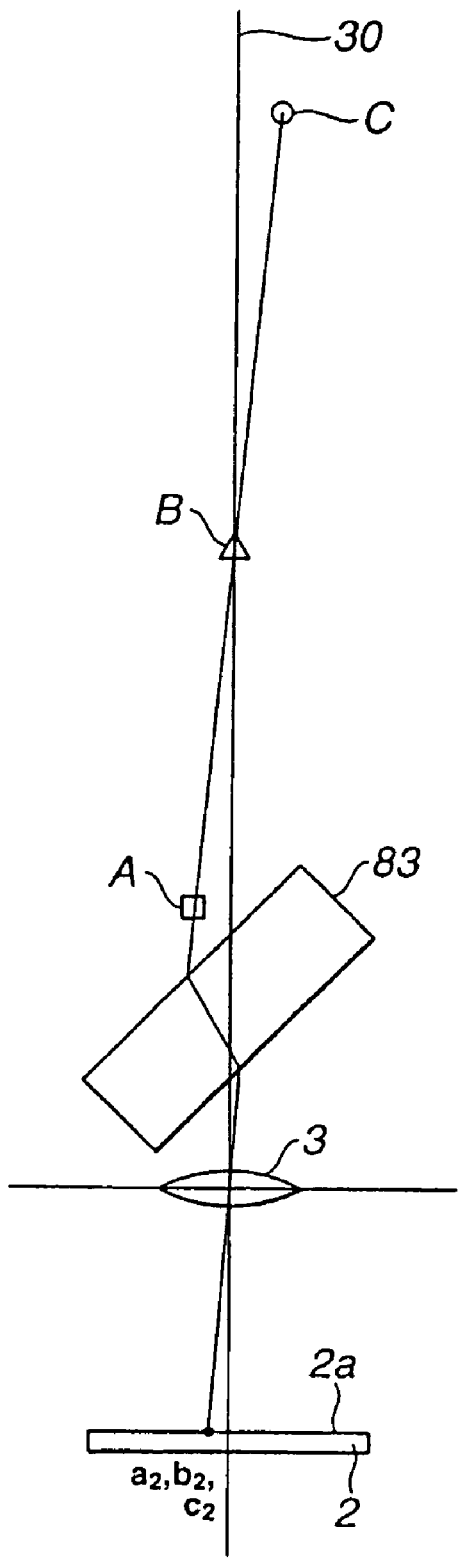

FIG. 18A shows the state that the transparent parallel plate 83 is not inserted, wherein the pickup target objects A, B, C form images at $a_1$, $b_1$, $c_1$ on the pickup face 2a of the CCD 2, respectively. FIG. 18B shows the state that the transparent parallel plate 83 is inserted on the optical axis 30 of the path, wherein the pickup target objects A, B, C form images at $a_2$, $b_2$, $c_2$ on the pickup face 2a, respectively.

For easy understanding, FIG. 18 shows an example of the arrangement of the objects A, B, C wherein the formed images $a_2$, $b_2$, $c_2$ are in the same position on the pickup face. It is easy, however, to understand from the following description that a stereovision is possible even with other arrangement of the objects A, B, C.

Figure 19A:
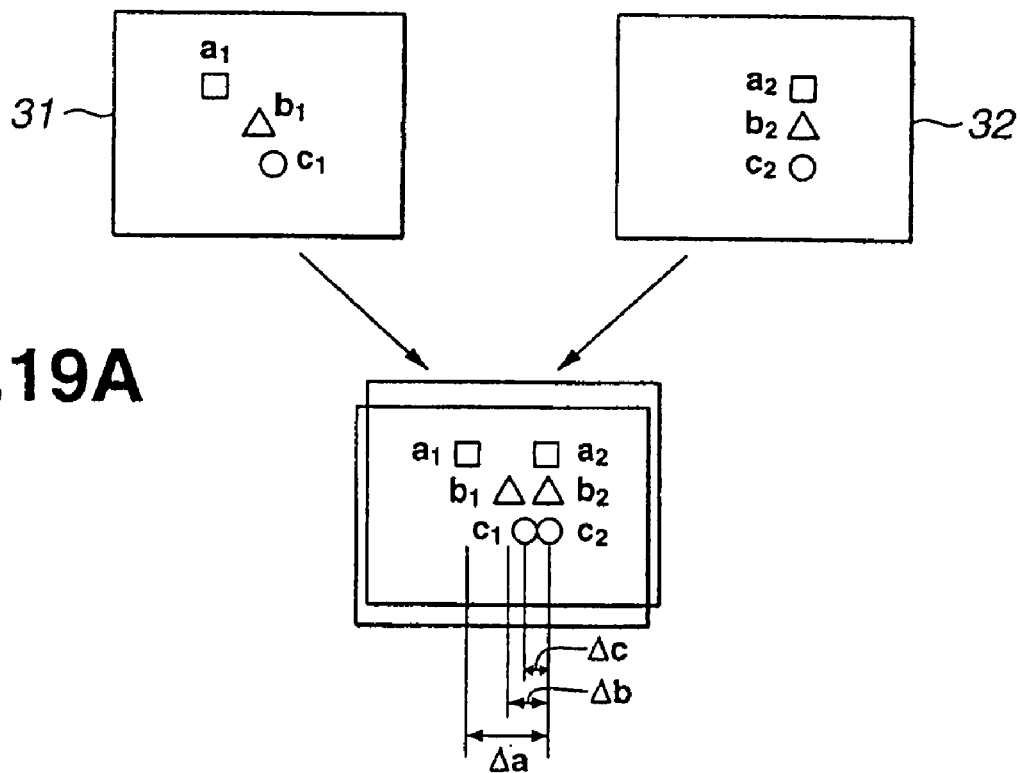
FIG. 19 is an explanatory view depicting that pickup is possible using the transparent parallel plate.
Figure 19B:
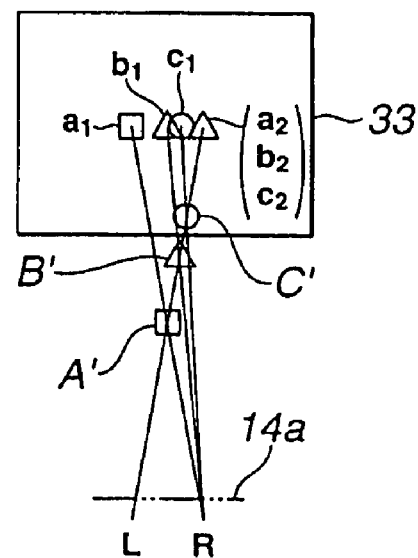

FIG. 19 shows formation of a stereoscopic image based on the pickup information wherein 31 is an image (first image) picked up without the transparent parallel plate 83 inserted as shown in FIG. 18A, and 32 is an image (second image) picked up with the transparent parallel plate 83 inserted as shown in FIG. 18B. In favor of description, $a_2$, $b_2$, $c_2$ are shown as if they are vertically offset with each other, while the position of $a_2$, $c_2$ is actually the same as that of $b_2$.

The pickup target objects A, B, C have been moved on the display screen (or on the pickup face) by Äa, Äb, Äc, respectively. 33 is a stereovision in the above-mentioned state, wherein all the objects are seen in such a way as to protrude forward in positions A', B', C' due to respective parallax.

Figure 20A:
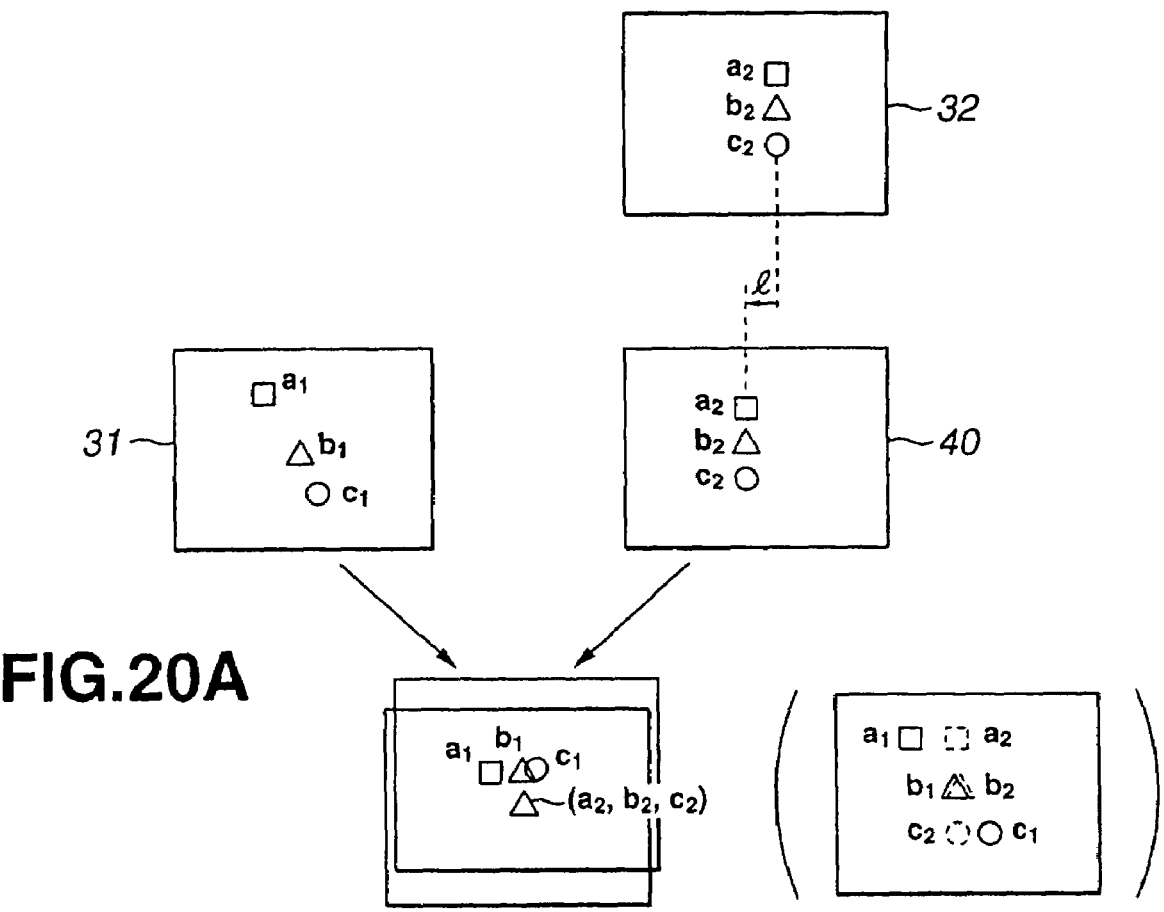
FIG. 20 is an explanatory view depicting that a natural stereoscopic image is obtained according to the present invention.

According to the present invention, the above phenomenon that all the pickup target objects A, B, C are seen in such a way as to protrude forward is corrected by the method as shown in FIG. 20. Specifically, in order that the formed image $b_2$, for example, of the image 32 with the transparent parallel plate 83 inserted (FIG. 18B) may coincide with the formed image $b_1$ of the image 31 picked up without the transparent parallel plate 83 inserted (FIG. 18A), the image 32 is moved in the cross direction to obtain a corrected image 40. Those images 31 and 40 are used and displayed on the display unit as depicted, e.g. in FIG. 24, allowing their viewing as a stereoscopic image.

Figure 20B:
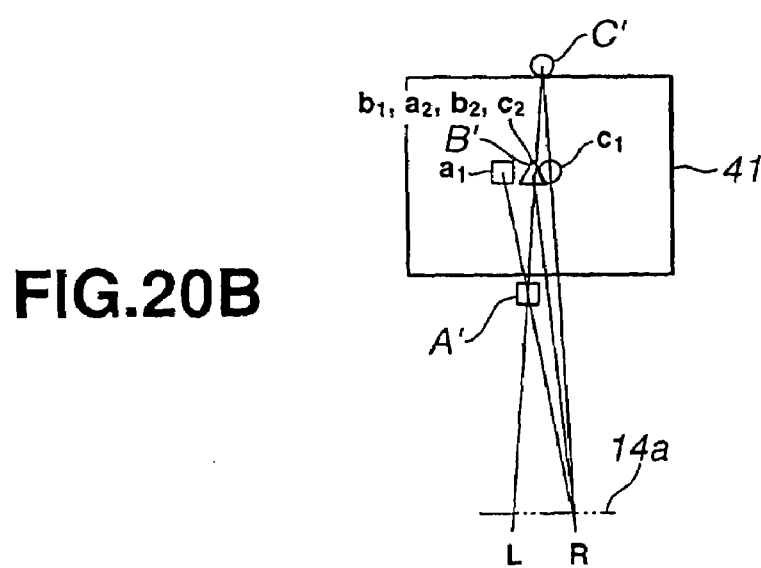

In FIG. 20B, 41 depicts the state that the images 31 and 40 are displayed alternately. Transmission and interception of light for the shutter 14a are controlled so that a viewer's right eye R can see the formed images $a_1$, $b_1$, $c_1$ of the image 31 picked up without the transparent parallel plate 83 inserted, and a viewer's left eye L can see $a_2$, $b_2$, $c_2$ of the corrected image 40 obtained by moving in the cross direction the image 32 picked up with the transparent parallel plate 83 inserted.

In such a way, in order that $b_2$, for example, of the image 32 picked up with the transparent parallel plate 83 inserted may coincide with $b_1$ of the image 31 picked up without the transparent parallel plate 83 inserted, the image 32 is moved in the cross direction to obtain corrected image 40. Displaying of those images 31, 40 allows adjustment of the position of fusion of an object designated in the images, which allows viewing as if the pickup target object A is in the position A' in the front of the screen, the pickup target object B is in the position B' on the screen, and the pickup target object C is in the position C' in the rear of the screen.

Therefore, there is no occurrence of the phenomenon that all the pickup target objects A, B, C are seen in such a way as to protrude forward as in the prior art, obtaining a natural stereoscopic image, resulting in possible reduction or elimination of a sense of fatigue in vision.

In place of making the formed images $b_1$, $b_2$ of the object B coincide with each other, any other objects (e.g. $a_1$, $a_2$ or $c_1$, $c_2$) may be made coincide with each other. In that case, the coinciding objects (e.g. A and C) are positioned on the screen (on the display surface).

Moreover, the image 31 picked up without the transparent parallel plate 83 inserted may be moved (to obtain corrected image) so as to conform to the image 32 picked up with the transparent parallel plate 83 inserted. Naturally, both the images 31, 32 may be moved together.

Figure 21A:
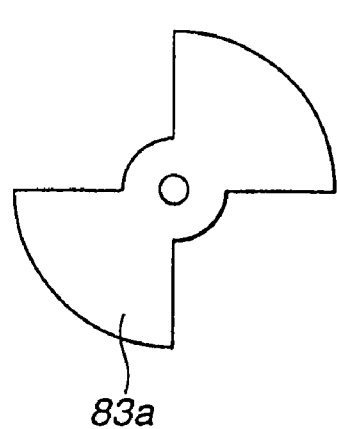
FIG. 21A and FIG. 21B are plan views of the transparent parallel plate.
Figure 21B:
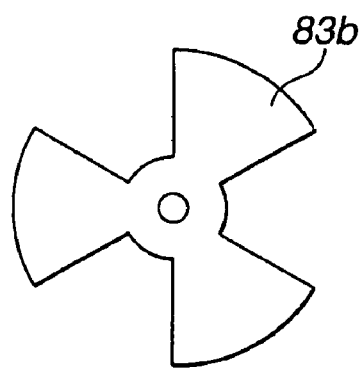
Figure 21C:
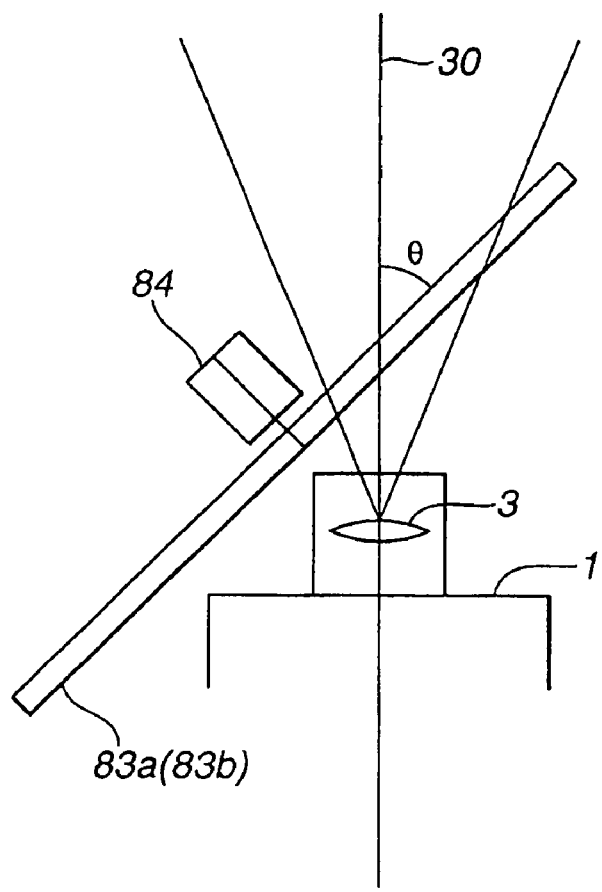
FIG. 21C is an explanatory view showing the arrangement state.
Figure 22A:
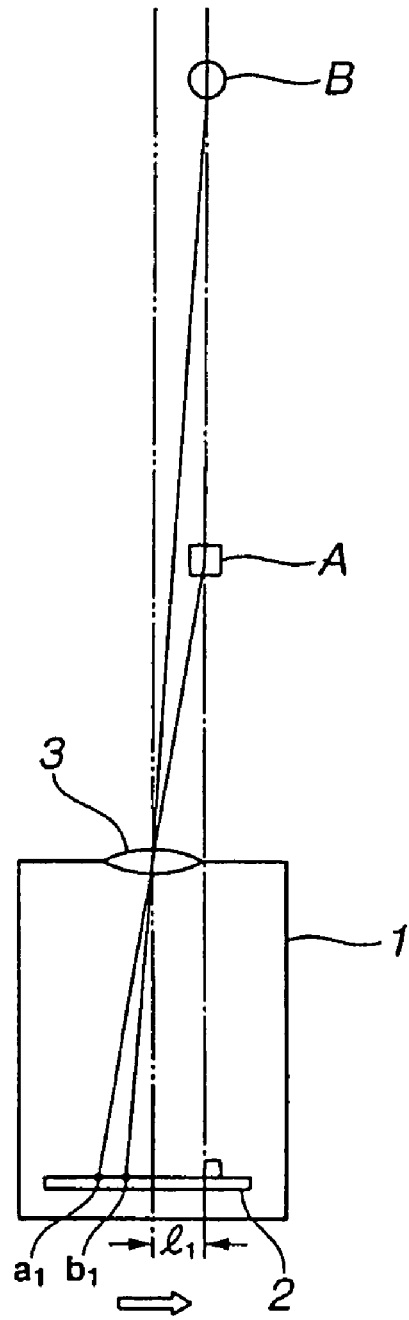
FIG. 22 is a schematic view showing the principle of conventional horizontal-run body pickup.
Figure 22B:
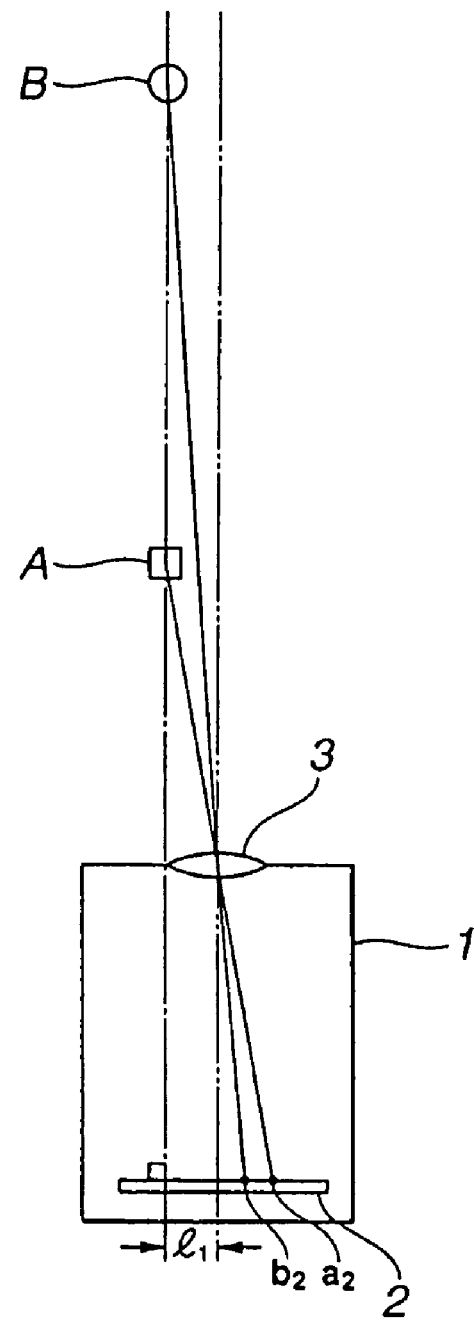
Figure 23A:
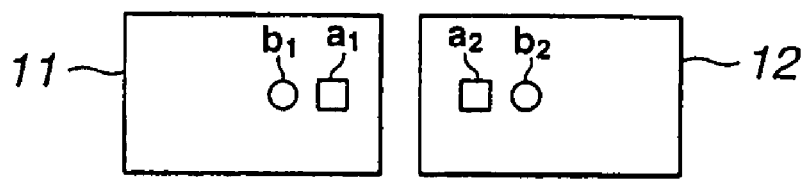
FIG. 23 is an explanatory view showing a stereoscopic construction in conventional horizontal-run body pickup.
Figure 23B:
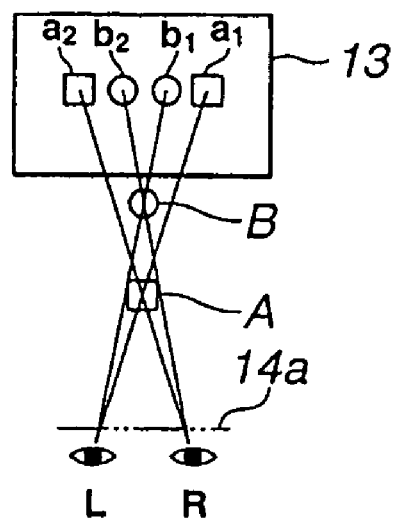

FIG. 21 shows a concrete example of the transparent parallel plate 83. The transparent parallel plate 83 is formed by equidistantly cutting out part of a disk transparent glass, for example, as shown by 83a in FIG. 21A or 83b in FIG. 21B. With the center mounted to a motor 84 as shown in FIG. 21, the transparent parallel plate is attached to the front of the camera 1 so as to have a predetermined angle è (e.g. 45 ) with respect to the optical axis 30 of the camera 1.

In this state, the transparent parallel plate 83a (83b) is rotated to allow loading/unloading (insertion/removal from the path connecting the camera 1 and the projection target objects) of the transparent parallel plate 83a (83b) in front of the lens 3. When applying the present invention to a video camera, for example, loading/unloading of the transparent parallel plate 83a (83b) can be made in synchronism with a vertical synchronizing signal.

Moreover, the shape of the transparent parallel plate 83 and insertion/elimination from the front of the lens are not limited to the above-mentioned structure of 83a (83b).

In the same way as described above, using the apparatus of FIG. 9, a stereoscopic image is generated as described above. Specifically, first, the image 31, for example, picked up without the transparent parallel plate 83 inserted (FIG. 18A) is stored in the image memory 61 as image signal (1), whereas the image 32, for example, picked up with the transparent parallel plate 83 inserted (FIG. 18B) is stored in the image memory 62 as image signal (2).

The image shift circuit 63 is a circuit which shifts (e.g. in the cross direction) an object noted in the image signals (1), (2) of the image memories 61, 62 to be in the same position on the display screen, wherein shift control is carried out based on a shift amount indicated from the outside by a shift-amount input device 64, and a shift mode indicated from the outside by mode selecting means 65 (mode for shifting the image signal (1) with respect to the image signal (2), mode for shifting the image signal (2) with respect to the image signal (1), mode for shifting both of (1) and (2), etc.), adjusting the position of fusion of an object picked up without the transparent parallel plate 83 inserted and an object picked up with the transparent parallel plate 83 inserted.

The image signals (1) and (2) with shift amount adjusted are input to the frame-signal generating device 66 wherein a television signal is generated having the image signals (1), (2) corresponding to even and odd fields, respectively. At this time, the frame-signal generating device 66 outputs a signal for switching the shutter 14a of the shutter eyeglasses 14 in correspondence with field switching, opening and closing the shutter 14a for right and left eyes.

The television signal out of the frame-signal generating device 66 is input and displayed on the display unit 67, which is seen through the shutter 14a for obtaining a stereoscopic image. Moreover, the television signal output from the frame-signal generating device 66 can be recorded and stored in a recording medium through the recording device 68.

In the embodiment, the transparent parallel plate 83 is disposed in the insertable and removable way between the lens 3 of the camera and the pickup target objects A, B, C. Instead, they may be disposed in the insertable and removable way between the lens 3 of the camera and the pickup face 2a and on the optical axis 30 of the camera.

Moreover, in place of the transparent parallel plate 83, the light transmitting means of the present invention may include other member that is substantially transparent and transmits light, for example, and has a light entering face and a light exiting face formed parallel to each other.

Further, the means for inserting/removing at a predetermined angle the light transmitting means from the path connecting the pickup element of the pickup apparatus and the pickup target objects may be other means in place of the motor 84.

As described above, according to the present invention in connection with the first and second embodiments, since the image moving means move a picked-up image to adjust the display position, there is no occurrence of the phenomenon that all the images are seen in such a way as to protrude forward as in the prior art, obtaining a natural stereoscopic image, resulting in possible reduction or elimination of a sense of fatigue in vision.

Moreover, according to the present invention in connection with the third embodiment, due to movable arrangement of the condenser-type optical means, a stereoscopically displayable image can be picked up without moving the camera. This results in very easy pickup of a stereoscopic image.

Further, since the image moving means move a picked-up image to adjust the display position, there is no occurrence of the phenomenon that all the images are seen in such a way as to protrude forward as in the prior art, obtaining a natural stereoscopic image, resulting in possible reduction or elimination of a sense of fatigue in vision.

Furthermore, according to the present invention in connection with the fourth embodiment, due to arrangement of the angle controlling means such as a variable apex-angle prism or the like, a stereoscopically displayable image can be picked up without moving the camera. This results in very easy pickup of a stereoscopic image.

Still further, since the image moving means move a picked-up image to adjust the display position, there is no occurrence of the phenomenon that all the images are seen in such a way as to protrude forward as in the prior art, obtaining a natural stereoscopic image, resulting in possible reduction or elimination of a sense of fatigue in vision.

Furthermore, according to the present invention in connection with the fifth embodiment, since the light transmitting means are arranged to be insertable at a predetermined angle on the path connecting the pickup element of the pickup apparatus and the pickup target objects, a stereoscopically displayable image can be picked up without moving the camera based on an image picked up with or without the light transmitting means inserted on the path. This results in very easy pickup of a stereoscopic image.

Still further, since the image moving means move a picked-up image to adjust the display position, there is no occurrence of the phenomenon that all the images are seen in such a way as to protrude forward as in the prior art, obtaining a natural stereoscopic image, resulting in possible reduction or elimination of a sense of fatigue in vision.

INDUSTRIAL APPLICABILITY

The present invention can be applied not only to a display system using the shutter 14a, but to other display unit which allows a stereovision due to binocular parallax.

The invention claimed is:

1. A stereoscopic-image generating method, comprising:
determining a position of an object in a first image;
determining a position of the object in a second image, wherein the first and second images are picked up using a transparent parallel plate having a cut out formed in the plate, wherein the plate is mounted to a pickup apparatus and the plate rotates so that the first image is picked up with the cut out in front of the pickup apparatus and the second image is picked up with the plate in front of the pickup apparatus; and
moving one of the first image or the second image so that the object in the first image coincides with the object in the second image.

2. The stereoscopic-image generating method as specified in claim 1, characterized in that the transparent parallel plate is mounted to the pickup apparatus at a predetermined angle.

3. The stereoscopic-image generating method as specified in claim 1, characterized in that angle controlling means are disposed between a pickup element of the pickup apparatus and a pickup target object, the angle controlling means controlling an outgoing angle of light emitted to a pickup face of the pickup apparatus,
wherein the first state is the state that the outgoing angle of the angle controlling means are controlled at a first angle, and
wherein the second state is the state that the outgoing angle of the angle controlling means are controlled at a second angle different from the first angle.

4. The stereoscopic-image generating method as specified in claim 3, characterized in that the angle controlling means comprise a variable apex-angle prism.

5. A stereoscopic-image generating apparatus, characterized in that it comprises:
first determining means for determining a position of an object in a first image;
second determining means for determining a position of the object in a second image, wherein the first and second images are picked up using a transparent parallel plate having a cut out formed in the plate, wherein the plate is mounted to a pickup apparatus and the plate rotates so that the first image is picked up with the cut out in front of the pickup apparatus and the second image is picked up with the plate in front of the pickup apparatus; and
means for moving one of the first image or the second image so that the object in the first image coincides with the object in the second image.

6. The stereoscopic-image generating apparatus as specified in claim 5, characterized in that it comprises frame-image generating means for generating a frame image based on the moved at least one of the first and second images.

7. The stereoscopic-image generating apparatus as specified in claim 5, characterized in that it comprises shift-amount setting means for setting a shift amount of the first and second images.

8. The stereoscopic-image generating apparatus as specified in claim 5, characterized in that it comprises mode selecting means for selecting a shift mode of the first and second images.

9. The stereoscopic-image generating apparatus as specified in claim 5, characterized in that the transparent parallel plate is mounted to the pickup apparatus at a predetermined angle.

10. The stereoscopic-image generating apparatus as specified in claim 5, characterized in that angle controlling means are disposed between a pickup element of the pickup apparatus and a pickup target object, the angle controlling means controlling an outgoing angle of light emitted to a pickup face of the pickup apparatus,
wherein the first state is the state that the outgoing angle of the angle controlling means are controlled at a first angle, and
wherein the second state is the state that the outgoing angle of the angle controlling means are controlled at a second angle different from the first angle.

11. The stereoscopic-image generating apparatus as specified in claim 10, characterized in that the angle controlling means comprise a variable apex-angle prism.

12. A stereoscopic-image generating method, comprising:
determining a position of an intermediate one of a plurality of objects in a first image;
determining a position of the intermediate object in a second image, wherein the first and second images are picked up using a transparent parallel plate having a cut out formed in the plate, wherein the plate is mounted to a pickup apparatus and the plate rotates so that the first image is picked up with the cut out in front of the pickup apparatus and the second image is picked up with the plate in front of the pickup apparatus;
displaying the first image and the second image on a screen; and
moving one of the first image or the second image so that the intermediate object in the first image coincides with the intermediate object in the second image and so that the intermediate object appears on the screen.

* * * * *